United States Patent
Seagle et al.

(10) Patent No.: US 7,689,481 B2
(45) Date of Patent: Mar. 30, 2010

(54) LIGHT WEIGHT, STRONG, FIRE RETARDANT DUNNAGE PLATFORM BAG AND SYSTEM OF LOADING, DISPENSING AND USING BAG

(75) Inventors: Vance L. Seagle, Henderson, NV (US); Philip J. Tschirn, One Tree Hill (AU)

(73) Assignee: Airdex International, Inc., Henderson, NV (US)

( * ) Notice: Subject to any disclaimer, the term of this patent is extended or adjusted under 35 U.S.C. 154(b) by 14 days.

(21) Appl. No.: 11/675,049

(22) Filed: Feb. 14, 2007

(65) Prior Publication Data

US 2007/0191984 A1    Aug. 16, 2007

Related U.S. Application Data

(60) Provisional application No. 60/817,989, filed on Jun. 30, 2006, provisional application No. 60/817,868, filed on Jun. 30, 2006, provisional application No. 60/773,454, filed on Feb. 15, 2006.

(51) Int. Cl.
| | |
|---|---|
| *G06Q 10/00* | (2006.01) |
| *G06Q 30/00* | (2006.01) |
| *B65D 65/02* | (2006.01) |
| *B65D 85/00* | (2006.01) |
| *A45C 5/14* | (2006.01) |
| *B65D 6/00* | (2006.01) |
| *B65D 8/14* | (2006.01) |
| *A45C 7/00* | (2006.01) |
| *A45C 13/04* | (2006.01) |
| *B65D 25/00* | (2006.01) |
| *B65G 59/00* | (2006.01) |
| *B65H 3/00* | (2006.01) |
| *B65D 83/00* | (2006.01) |
| *G07F 11/16* | (2006.01) |
| *G08B 13/14* | (2006.01) |

(52) U.S. Cl. .............................. 705/28; 705/1; 150/154; 190/18 A; 220/4.28; 220/9.2; 220/9.4; 221/22; 221/64; 221/306; 340/572.1

(58) Field of Classification Search ....................... None
See application file for complete search history.

(56) References Cited

U.S. PATENT DOCUMENTS 2,676,703 A * 4/1954 Charman ..................... 206/597

(Continued)

FOREIGN PATENT DOCUMENTS

CH     404185     12/1965

(Continued)

OTHER PUBLICATIONS

Kempfer, L., "Lighten the Load," Material Handling Management, pp. 26-31 (Aug. 2006).

*Primary Examiner*—F. Zeender
*Assistant Examiner*—Asfand M Sheikh
(74) *Attorney, Agent, or Firm*—Fliesler Meyer LLP

(57) ABSTRACT

The present invention provides a dunnage platform bag that is light weight, strong, made of a fire retardant material and which forms an ultra violet light, weather and dust particle barrier to protect the integrity of the dunnage platforms when not in use. A system and method for supplying, dispensing, positioning, tracking, transporting, forwarding and storing dunnage platforms based on the dunnage platforms bag is disclosed. In an embodiment of the invention, a modified dunnage platform made up of a dunnage platform base and attached legs can be stored in the dunnage platform bag.

23 Claims, 38 Drawing Sheets

U.S. PATENT DOCUMENTS

| | | | |
|---|---|---|---|
| 2,893,588 A * | 7/1959 | Martin | 220/4.28 |
| 3,088,619 A * | 5/1963 | Comyn | 220/1.5 |
| 3,266,656 A * | 8/1966 | Kridle | 220/4.28 |
| 3,424,364 A * | 1/1969 | Grafslund | 206/340 |
| 3,511,191 A | 5/1970 | Barry | |
| 3,581,681 A | 6/1971 | Newton | |
| 3,654,012 A | 4/1972 | Schlager | |
| 3,903,023 A | 9/1975 | Boutillier | |
| 4,244,411 A * | 1/1981 | Karlstrom et al. | 150/154 |
| 4,397,246 A | 8/1983 | Ishida | |
| 4,627,539 A * | 12/1986 | Chang et al. | 206/597 |
| 4,661,302 A | 4/1987 | Park | |
| 4,705,811 A | 11/1987 | Park | |
| 4,734,441 A | 3/1988 | Park | |
| 4,796,540 A | 1/1989 | Pelfrey | |
| 5,026,321 A * | 6/1991 | Benson | 453/54 |
| 5,098,498 A | 3/1992 | Hale | |
| 5,156,094 A | 10/1992 | Johansson | |
| 5,266,396 A | 11/1993 | Howard | |
| 5,362,436 A | 11/1994 | Wagner | |
| 5,369,135 A | 11/1994 | Campbell | |
| 5,401,456 A | 3/1995 | Alesi, Jr. | |
| 5,417,167 A | 5/1995 | Sadr | |
| 5,492,504 A * | 2/1996 | Wolters | 453/54 |
| 5,525,636 A | 6/1996 | Henn | |
| 5,544,568 A | 8/1996 | Potgeiter | |
| 5,555,980 A | 9/1996 | Johnston | |
| 5,598,675 A | 2/1997 | Pruss | |
| 5,601,912 A | 2/1997 | Ellingson | |
| 5,685,644 A | 11/1997 | Taylor | |
| 5,833,796 A | 11/1998 | Matich | |
| 6,021,916 A | 2/2000 | Stolzman | |
| 6,029,583 A | 2/2000 | LeTrudet | |
| 6,076,693 A | 6/2000 | Reiter | |
| 6,123,032 A | 9/2000 | Ohanesian | |
| 6,191,228 B1 | 2/2001 | Nosker | |
| 6,224,706 B1 | 5/2001 | Matich | |
| 6,294,114 B1 | 9/2001 | Muirhead | |
| 6,380,294 B1 | 4/2002 | Babinec | |
| 6,395,791 B1 | 5/2002 | Chaudhary | |
| 6,431,372 B1 | 8/2002 | Aoyama | |
| 6,446,563 B1 | 9/2002 | Ohanesian | |
| 6,458,232 B1 | 10/2002 | Valentinsson | |
| 6,622,642 B2 | 9/2003 | Ohanesian | |
| 6,659,020 B1 | 12/2003 | Ball | |
| 6,745,703 B2 | 6/2004 | Torrey | |
| 6,748,876 B2 | 6/2004 | Preisler | |
| 6,786,992 B2 | 9/2004 | Dummett | |
| 6,824,860 B2 | 11/2004 | Edwards | |
| 6,941,877 B2 | 9/2005 | Dickner | |
| 6,943,678 B2 | 9/2005 | Muirhead | |
| 6,955,129 B2 | 10/2005 | Moore | |
| 6,976,436 B1 | 12/2005 | Sugihara | |
| 6,984,695 B2 | 1/2006 | Brown | |
| 7,025,208 B2 | 4/2006 | Baker | |
| D521,208 S | 5/2006 | France | |
| 7,044,066 B1 | 5/2006 | Miller | |
| 7,128,797 B2 | 10/2006 | Dummett | |
| 7,342,496 B2 * | 3/2008 | Muirhead | 340/572.1 |
| 2002/0015811 A1 | 2/2002 | Gusavage | |
| 2002/0097282 A1* | 7/2002 | Maltseff | 347/5 |
| 2002/0125090 A1* | 9/2002 | Mercado et al. | 190/107 |
| 2004/0112907 A1 | 6/2004 | Donnelly | |
| 2005/0108988 A1 | 5/2005 | Dickner | |
| 2005/0263044 A1 | 12/2005 | Bearse | |
| 2005/0274296 A1 | 12/2005 | Dickner | |
| 2006/0090844 A1 | 5/2006 | Dummett | |

FOREIGN PATENT DOCUMENTS

| | | |
|---|---|---|
| DE | 2045712 | 3/1972 |
| DE | 8429708.5 | 2/1985 |
| EP | 0 422 542 | 6/1990 |
| EP | 0 480 541 | 4/1992 |
| EP | 0 520 508 | 6/1992 |
| EP | 1 500 599 | 9/2007 |
| GB | 1308036 | 2/1973 |
| WO | WO 95/23682 | 9/1995 |
| WO | WO 02/38471 | 5/2002 |
| WO | WO 03/099668 | 12/2003 |
| WO | WO 03/099676 | 12/2003 |
| WO | WO 03/099689 | 12/2003 |
| WO | WO 2004/026713 | 4/2004 |
| WO | WO 2005/105590 | 11/2005 |
| WO | WO 2005/105599 | 11/2005 |

* cited by examiner

LIGHT WEIGHT, STRONG, FIRE RETARDANT DUNNAGE PLATFORM BAG AND SYSTEM OF LOADING, DISPENSING AND USING BAG

PRIORITY CLAIM

This application claims priority to:

(1) U.S. Provisional Patent Application Ser. No. 60/773,454, entitled: "LIGHT WEIGHT, STRONG, FIRE RETARDANT DUNNAGE PLATFORM BAG AND SYSTEM OF LOADING, DISPENSING AND USING BAG", inventors: Seagle et al., filed Feb. 15, 2006;

(2) U.S. Provisional Patent Application Ser. No. 60/817,868, entitled: "FREIGHT FORWARDING SYSTEM", inventors: Seagle et al., filed Jun. 30, 2006; and (3) U.S. Provisional Patent Application Ser. No. 60/817,989, entitled: "SYSTEM FOR RETAINING LEGS ON A LIGHT WEIGHT THERMOPLASTIC DUNNAGE PLATFORM AND INSTALLING MOLDED LEGS ON A DUNNAGE PLATFORM DECK", inventors: Seagle et al., filed Jun. 30, 2006. These applications are herein expressly incorporated by reference in their entireties.

CROSS REFERENCE TO RELATED APPLICATIONS

This application is related to the following application:

(4) U.S. patent application Ser. No. 11/672,863, entitled: "MODULAR, KNOCK-DOWN, LIGHT WEIGHT, THERMALLY INSULATING, TAMPER PROOF SHIPPING CONTAINER AND FIRE RETARDANT SHIPPING BAG" inventors: Seagle et al., filed Feb. 8, 2007. The application is herein expressly incorporated by reference in its entirety.

FIELD OF THE INVENTION

This invention is in the general field of a dunnage platform bag that is light weight, strong and made of a fire retardant material. The dunnage platform bag can accommodate a modified dunnage platform assembled from a dunnage platform base and legs attached to the base. The dunnage platform bag can form an ultra violet light, weather and dust barrier to protect the integrity of the dunnage platforms when not in use. A system and method for supplying, dispensing, positioning, tracking, transporting, forwarding and storing dunnage platforms based on the dunnage platforms bag is disclosed.

BACKGROUND OF THE INVENTION

The adoption of International Standardized Phytosanitary Monitoring (ISPM)-15 for wood packaging material (WPM) requires kiln dry treatment of all wood used in shipping crates and dunnage platforms (pallets). The United States in cooperation with Mexico and Canada began enforcement of the ISPM 15 standard on Sep. 16, 2005. The North American Plant Protection Organization (NAPPO) strategy for enhanced enforcement will be conducted in three phases. Phase 1, Sep. 16, 2005 through Jan. 31, 2006, call for the implementation of an informed compliance via account managers and notices posted in connection with cargo that contains noncompliant WPM. Phase 2, Feb. 1, 2006 through Jul. 4, 2006, calls for rejection of violative crates and pallets through re-exportation from North America. Informed compliance via account managers and notices posted in cargo with other types of non-compliant WPM continues to remain enforce. Phase 3, Jul. 5, 2006, involves full enforcement on all articles of regulated WPM entering North America. Non-compliant regulated WPM will not be allowed to enter the United States. The adoption of ISPM-15 reflects the growing concern among nations about wood shipping products enabling the importation of wood-boring insects, including the Asian Long horned Beetle, the Asian Cerambycid Beetle, the Pine Wood Nematode, the Pine Wilt Nematode and the Anoplophora Glapripwnnis.

Thus the wooden dunnage platform has become unattractive for the international shipment of products. Further, the wooden surface is not sanitary since it potentially can harbor in addition to insects, mould and bacteria. Thus, the wooden crate is generally ill-suited for the shipment of foodstuffs and other produce requiring sanitary conditions.

Plastic dunnage platforms or pallets are known, see U.S. Pat. No. 3,915,089 to Nania, and U.S. Pat. No. 6,216,608 to Woods et al., which are herein incorporated by reference in their entirety. Plastic pallet manufacturing techniques typically involve injection molding, which significantly increases the cost of the plastic pallets. In order to justify this initial investment cost of the plastic pallet, the pallet must be extensively re-used. Thus, while the plastic surface of the plastic pallet obviates some of the sanitary problems with wood pallets, because of the required repetitive use the surface can become unsanitary. As a consequence when used for the shipment of foodstuffs and other produce requiring sanitary conditions, the high cost of the plastic pallet requires that the plastic surface be cleaned and kept clean prior to use.

Some wood pallet manufacturers have attempted to produce a more sanitary surface by combining foam with wooden surfaces. These dunnage platforms still suffer a number of disadvantages including their weight, the presence of wood requiring kiln treatment and the possibility of the foam being stripped away to expose the wood surface.

Thermoplastic molded dunnage platforms are known. U.S. Pat. No. 5,833,796 to Dummett, which is herein incorporated by reference in its entirety, which discloses applying thermoplastic sheets to a preformed rigid structure for manufacturing dunnage platforms.

Irrespective of the material used to make the dunnage platform sanitary, there remains a problem in the field of keeping sanitary dunnage platforms clean while they are being stored or otherwise not in use.

Further, irrespective of whether the dunnage platforms are made of wood, plastic, foam or thermoplastic, they are a source of fuel for a fire and thus represent a fire hazard. Storage of dunnage platforms after unloading, either inside or outside the delivery location increases the risk of a significant fire. Flame retardant materials are known, however, they have not been successfully incorporated into dunnage platform construction materials. Thus there is a need for a sanitary dunnage platform suitable for transporting foodstuffs, which is light, cheap and does not present a fire hazard. Since materials being shipped can also represent a fire hazard, while somewhat beneficial, it is not essential that the dunnage platform per se be fire resistant. However, there is a need for a method of storing, loading, dispensing and shipping empty sanitary dunnage platforms, which are light, inexpensive and not a fire hazard.

Optiledge™ feet are lightweight, strong, phytosanitary, molded feet in an L-shape designed to attach to the bottom of a crate or shipping unit and which can act as a transport device. Optiledge™ can in some circumstances be used as an alternative to a wood pallet for loading and shipping units. When the product to be shipped contains a deck, Optiledge™ can be made integral to the packaged product and can act as a pallet during the storage and distribution of the packaged product. Optiledge™ or any similar device is not appropriate when the unit load does not include a deck surface onto which the Optiledge™ type device can be mounted

SUMMARY OF THE INVENTION

In one embodiment of the invention, a dunnage platform bag is disclosed that is light weight, strong, made of a fire retardant material and which forms an ultra violet light, weather and dust particle barrier to protect the integrity of the dunnage platforms when not in use. In addition, a system and method for loading, storing, dispensing, positioning, tracking, and transporting empty dunnage platforms based on the dunnage platform bag is disclosed.

In an alternative embodiment of the present invention, a dunnage platform with damaged feet is modified such that the feet can be removed and replacement feet can be attached. In an embodiment of the present invention, the damaged feet of a dunnage platform can be removed and Optiledge™ feet can be attached to the dunnage platform deck. In another embodiment of the invention, a dunnage platform deck with stubs is manufactured and molded feet are press fitted into the stubs or otherwise attached to the dunnage platform deck. In various embodiments of the invention, the modified dunnage platforms can be loaded into the dunnage platform bag.

This summary is not intended to be a complete description of, or limit the scope of, the invention. Other embodiments of methods for manufacturing a dunnage platform and repairing the legs of damaged dunnage platforms, within the spirit and scope of the invention, can be understood by a person having ordinary skill in the art. Alternative and additional features, aspects, and objects of the invention can be obtained from a review of the specification, the figures, and the claims.

DETAILED DESCRIPTION OF THE INVENTION

Figure 1:
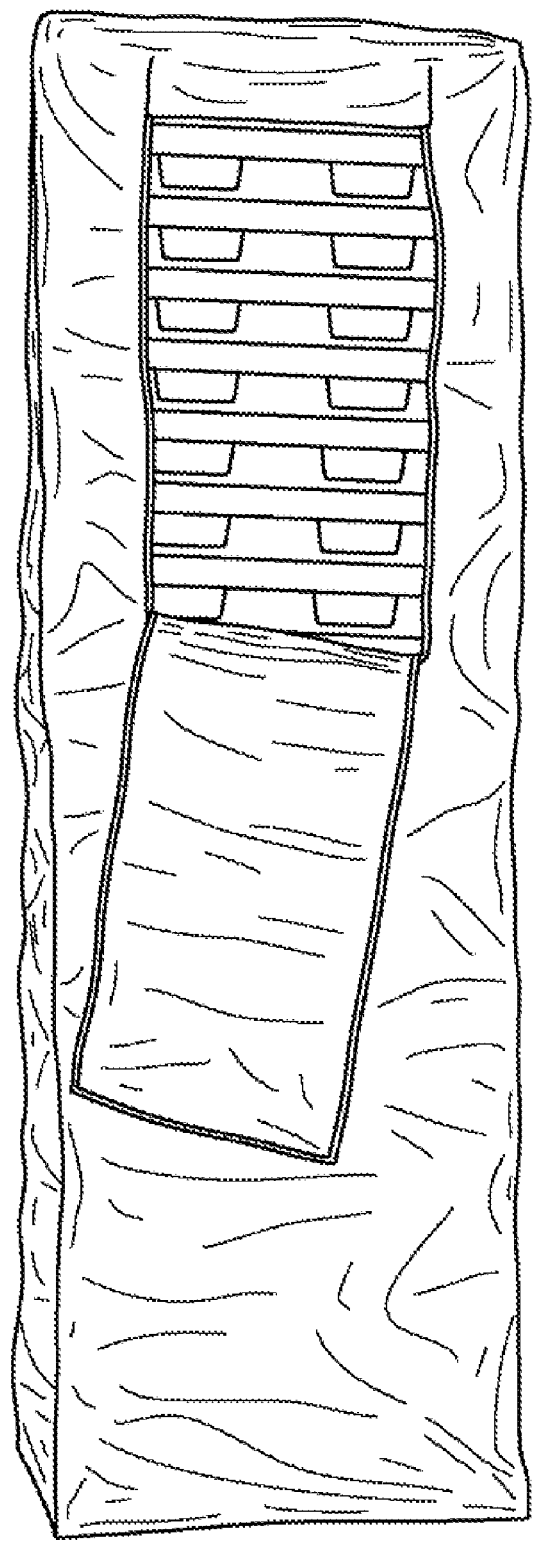
FIG. 1 shows the dunnage platform bag (length, 1027 mm (50 inches)×width, 1067 mm (42 inches)×height, 30.5 m (120 inches)) holding 22 dunnage platforms (each of dimension 1219 mm (48 inches)×1016 mm (40 inches)×139 mm (5.5 inches)) prior to stretching and hanging, where the zippered bag is opened for manual insertion, removal or inspection of the dunnage platforms.

In one embodiment of the invention, a manufacturer makes a commitment to an airfreight cargo forwarder of a cargo lift volume contract in return for supply of thermoplastic dunnage platforms to resolve ISPM-15 issues and other advantages such as cargo safety, human safety, convenience and resolving fire risk issues involved with storage of flammable dunnage platforms. Client agrees to pay shipping freight cost as would be incurred with wood pallets. In return the manufacturer makes a commitment of sufficient thermoplastic dunnage platforms for shipping the cargo. The airfreight cargo forwarder who assigns manufacturing capacity to clients requires a balancing commitment from the client of a cargo lift volume contract. The airfreight cargo forwarder saves between 17 and 33% of the total freight cost of shipping the cargo (after subtracting the cost of the thermoplastic dunnage platforms), while solving clients ISPM-15 concerns.

In an embodiment of the invention, a dunnage platform manufacturer (hereinafter 'manufacturer'), shipping forwarder (hereinafter 'forwarder') and manufacturer with cargo to ship (hereinafter 'client') co-operate to ship a client's cargo without ISPM-15 concerns at a reduced cargo freight cost, thereby producing a useful concrete and tangible result. In another embodiment of the present invention, the manufacturer ships the thermoplastic dunnage platforms in a fire retardant bag which the client can use to hang and store the dunnage platforms thereby saving space while eliminating a fire hazard and thereby producing a useful concrete and tangible result. In an alternative embodiment of the present invention, the manufacture supplies dunnage platforms with RFID tags thereby allowing the forwarder to track the shipment while en route thereby producing a useful concrete and tangible result.

Forwarders to provide dunnage platforms to their clients free of charge in exchange for retaining the financial benefit of weight savings, while giving their clients: (1) improved convenience, (2) cost of not having to buy pallets, (3) eliminating ISPM-15 issues, (4) improving cargo safety (5) improving human safety and (6) gaining greater contracted cargo volume from clients.

Manufacturer production facilities are: (1) remarkably portable and inexpensive, (2) easily deployed anywhere, and (3) able to produce up to 15,000 pallets per month. Factories can be readily placed in forwarders' market regions to service their local clients. No other competitive pallet production can match this scalability and the manufacturer manufacturing process is fully patented.

Each forwarder can secure exclusive "Agency" rights for a port or market region and pre-sell the full monthly production allocation of 15,000 pallets (per manufacturer machine) by consigning them free of charge to strategic clients in exchange for cargo lift volume contracts. When the first allocation is gone, pre-sale of a second unit can begin until the major market clients can be fully sold on a first-option basis. This strategy removes all risks from the program rollout. Clients can be selected based on optimum profiles for cargo destinations, freight costs, type of cargo, size and importance of client and overall value of service the program provides to forwarder and client.

Revenues to forwarder can be calculated on a cargo weight savings basis of 40 pounds per pallet and pallet costs can be paid to manufacturer from those savings, leaving the cash balance to the forwarder. At $1 per pound, each pallet can yield $15 cash profit ($225,000 month) to the forwarder. At $0.75 pound, it can produce $75,000 per month, especially considering surcharges alone are reaching as much as $0.80 per pound in some markets. The forwarder can have no cash risk, as manufacturer is paid $25 per pallet from the saving stream (following collection of client's invoices) and the remainder is held by the forwarder. The only investment of the forwarder is the cost of sales efforts to pre-sell the cargo region.

Figure 2:
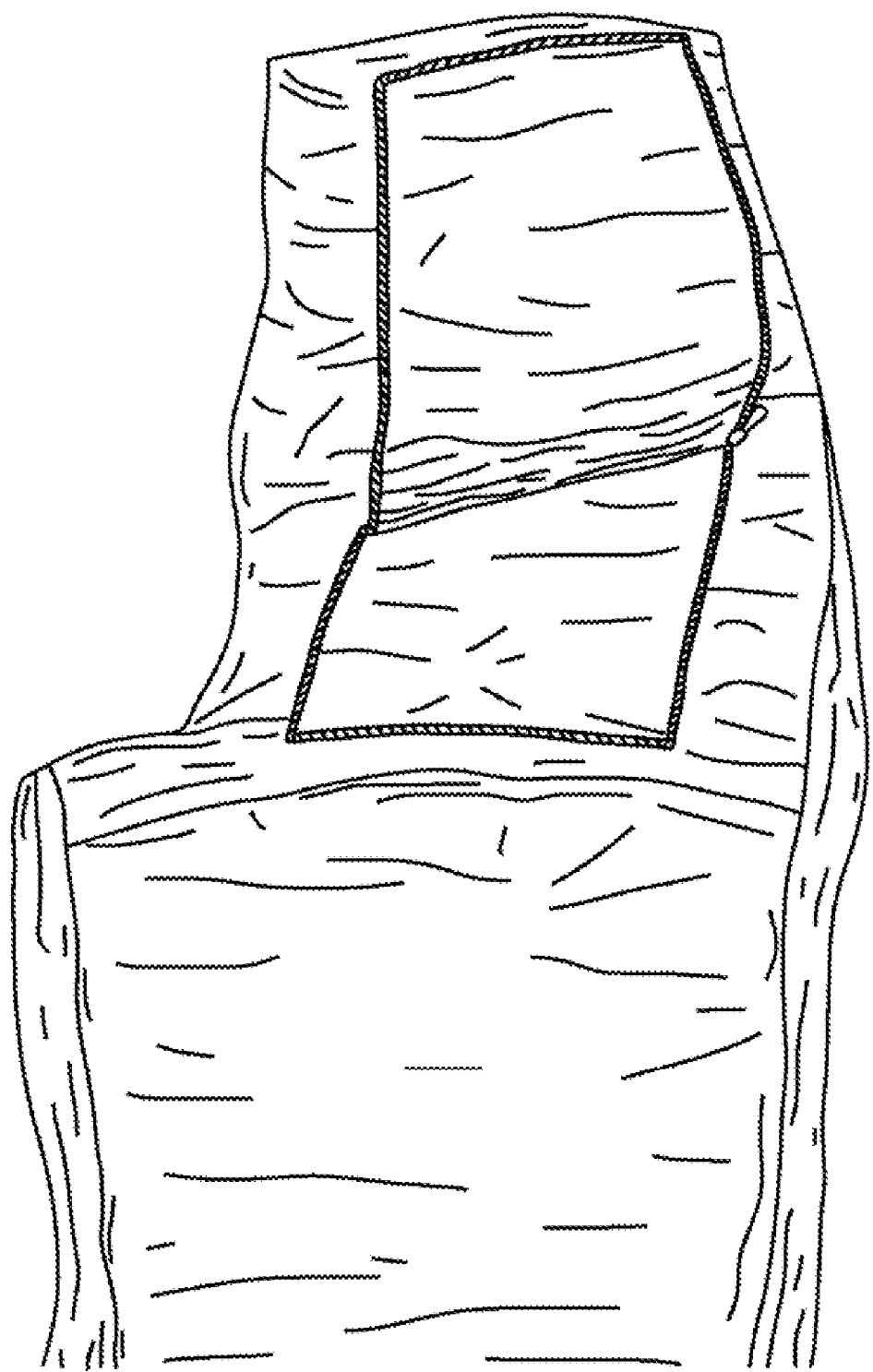
FIG. 2 shows the dunnage platform bag lying on a level surface holding a dunnage platform, at one end, and two zippers open for manual insertion, removal and inspection.

In one embodiment of the invention, the dunnage platform bag is a modular, lightweight, strong, ultra violet light insulating, fire resistant, tamper proof receptacle for storing, reloading, dispensing, tracking and transporting dunnage platforms. FIGS. 1 and 2 depict an embodiment of the dunnage platform bag invention in which the dunnage platform bag is 30.5 m (120 inches)×1.27 m (50 inches)×1.07 m (42 inches) and weighs 3.2 kg (7 lb). In another embodiment, the dunnage platform bag includes a spreader and base. In other embodiments the dimension of the dunnage platform bag will vary depending on the dimension of the dunnage platform to be stored in the bag. In one embodiment of the invention, the dunnage platform bag consists of four sides a top and a bottom sewn together. In one embodiment of the invention, two parallel zippers separated by between approximately 52-78 mm (20-30 inches) can each sewn into one side of the bag and located on that side approximately 13 mm (5 inches) down from top of the bag and approximately 10 m (40 inches) from the bottom of the bag. In this invention, it will be understood by persons having skill in the art that the use of the term 'approximately' when used together with dimensions that indicate a preferred range can vary by up to 50% of the preferred range. In another embodiment of the invention, the zippers extend the full length of the bag. In another embodiment, a cord string is attached to the two zippers to enable both zippers to be opened or close simultaneously. In an alternative embodiment, Velcro™ is used to reseal one or more openings in the dunnage platform bag. In another embodiment, one or more re-sealable openings can be used for inserting, removing or inspecting the plurality of dunnage platforms.

FIG. 1, shows the dunnage platform bag holding 22 dunnage platforms (of dimension 1219 mm (48 inches)×1016 mm (40 inches)×139 mm (5.5 inches)) prior to stretching and hanging. FIGS. 1 and 2 show that the dunnage platform bag material is sufficiently strong to allow handling of the fully loaded dunnage platform bag.

In one embodiment of the invention, the material of the bag is strong enough to allow the bag to be hoisted and the dunnage platform bag and transport base left hanging for dispensing. In an embodiment, of the invention thermoplastic molded dunnage platforms can be loaded in the dunnage platform bag. In an embodiment of the invention, the thermoplastic dunnage platforms have RFID tags inserted into the core prior to coating the core with the thermoplastic layer. A RFID reader mounted in the base or the spreader can then read the RFID tags in the individual dunnage platforms. In an alternative embodiment of the invention, plastic dunnage platforms can be loaded in the dunnage platform bag. In another embodiment, cargo loaded on one or more dunnage platforms can be inserted into the dunnage platform bag. In various embodiments, sufficiently strong material can be used and the seams can be strengthened to compensate for the additional weight of the plastic dunnage platforms or the cargo.

FIG. 1 shows that the dunnage platform bag holding twenty-two dunnage platforms remains stable when the zippered bag is opened for manual insertion, removal or inspection of the dunnage platforms. FIG. 2 shows the dunnage platform bag lying lengthwise on a surface holding a dunnage platform and two zippers open for manual insertion, removal and inspection of the dunnage platforms.

Figure 3:
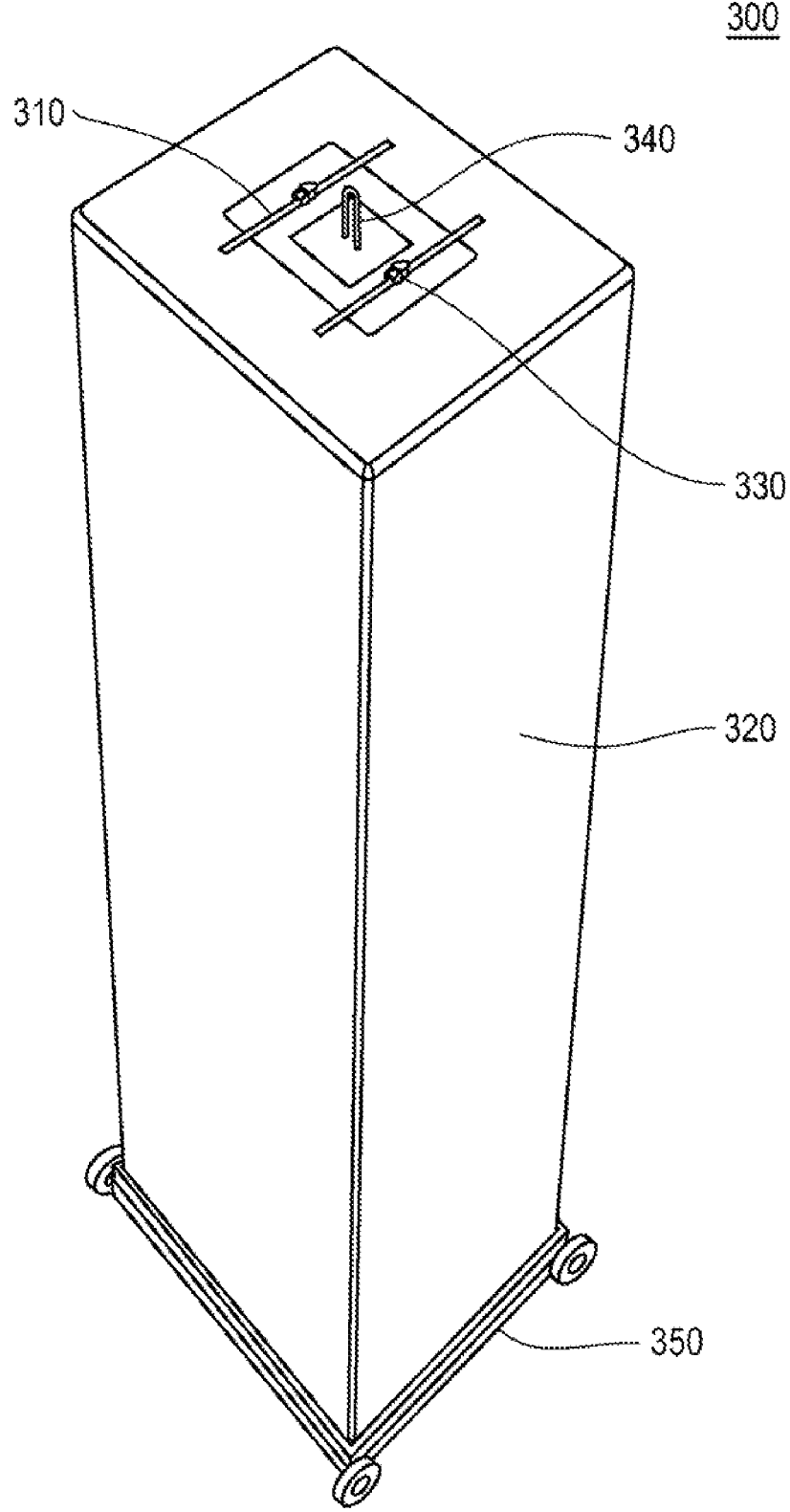
FIG. 3 shows a Computer Assisted Drawing (CAD) perspective of the dunnage platform bag attached to a base frame.

FIG. 3 shows a perspective of the dunnage platform bag 300 attached to a transport base frame total height 3.267 m (128 11/16 inches). In an embodiment of the invention, the dunnage platform bag 320 has a top and four sides, where the four sides can be attached to a transport base, which forms the bottom side. In an embodiment of the invention, the transport base frame 350 has a flange attached to the inside of the frame which abuts the lowest dunnage platform (i.e., the dunnage platform in contact with the dunnage platform stop trigger 910) so as to seal the bottom of the dunnage platform bag. The flange is flexible enough to allow the dunnage platforms to be dispensed or reloaded while retaining sufficient rigidity to form a seal between the transport base frame 650 and the undercarriage or sides of the lowest dunnage platform in the stack of dunnage platforms loaded in the bag. In various embodiments of the invention, the flange can be made of flexible rubber or plastic.

In FIG. 3, a spreader plate 310 has dimensions slightly larger than the length and width of the bag 320 to which it is attached through load binders 330. In an embodiment of the invention, a hook 340 with plate submerged into the spreader plate 310 is used to hold the bag 320 upright. In an embodiment of the invention, the bag is sealed at the top.

In an embodiment of the invention, the bag 320 fits into a transport base frame or base 350, with dimensions 1435 mm (56 9/16 inches)×1101 mm (43 3/8 inches) with four wheels attached at the four corners of the transport base frame. In one embodiment of the invention, the wheels can be fixed in an orientation where their axis of rotation is perpendicular to the length of the base frame, which allows the base to be rolled in the direction of its longitudinal axis. In another embodiment of the invention, the wheels can be fixed in an orientation where their axis of rotation is perpendicular to the width of the base frame, which allows the base to be rolled perpendicular to the direction of its longitudinal axis. In an alternative embodiment of the invention, two or more wheels are not fixed in an orientation or are able to swivel, allowing greater flexibility in the direction in which the base can be rolled. In one embodiment of the invention, the base has two wheels attached at two corners and two supports at the other two corners, which enable the bag to be tilted and the base and bag to be wheeled about on the two wheels.

Figure 4:
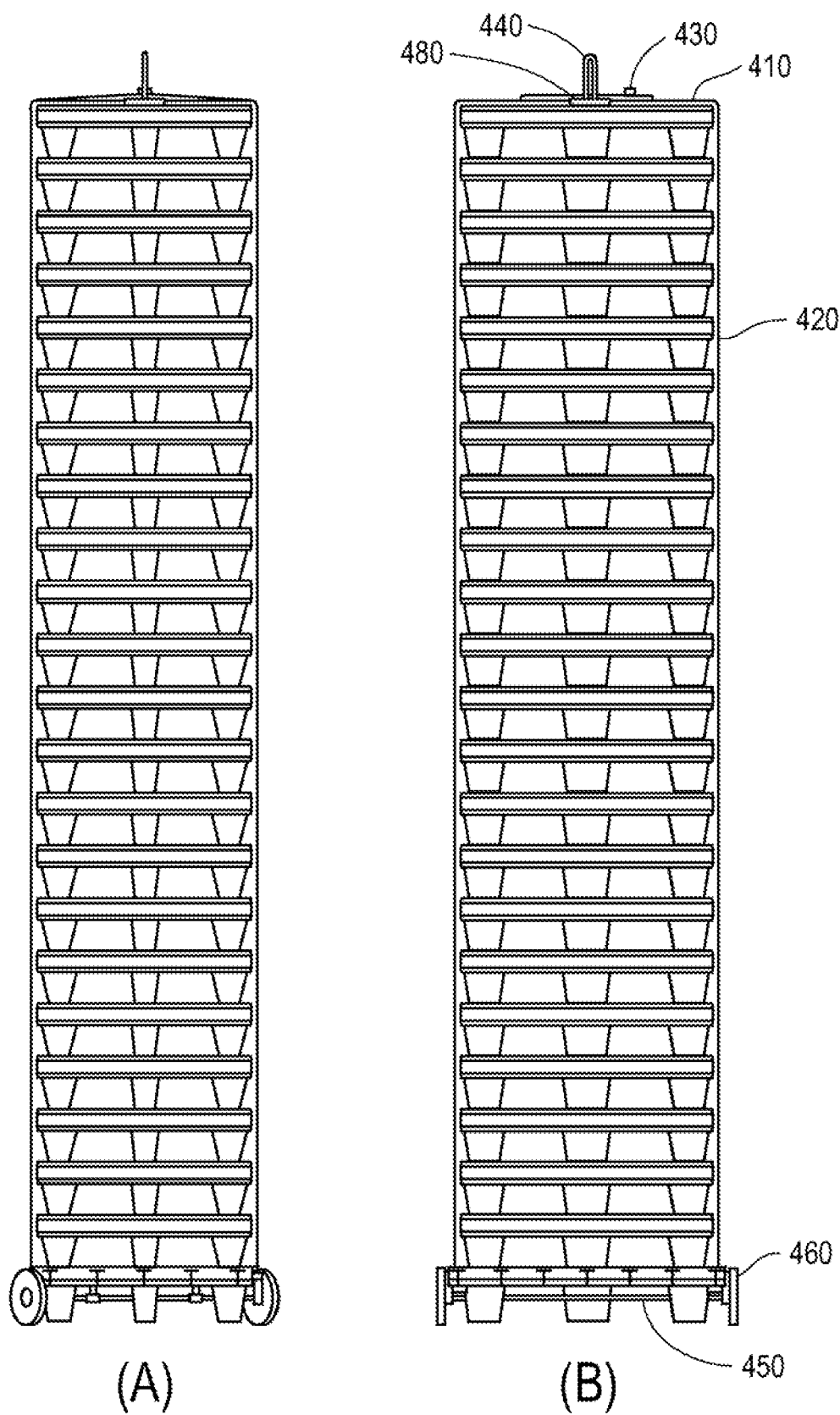
FIG. 4 shows CAD of (A) a front and (B) a side perspective of the dunnage platform bag attached to a base frame.

In one embodiment of the invention, the transport base frame can be used to dispense dunnage platforms. FIG. 4 shows (A) a side and (B) a front view of the dunnage platform bag 420 attached to a base frame 450. In the embodiment shown in FIG. 4, wheels 460 can be positioned at each of the four corners. The front view shows the base plate 480 submerged beneath the spreader plate 410, held in place by the load binders 330 and the hook 440. In this embodiment of the invention, the distance between the dunnage platform and the floor is 11 mm (7/16 inch). In an alternative embodiment of the invention, the base frame can be raised above the floor allowing the dunnage platform to be dispensed from beneath the transport base frame.

Figure 5A:
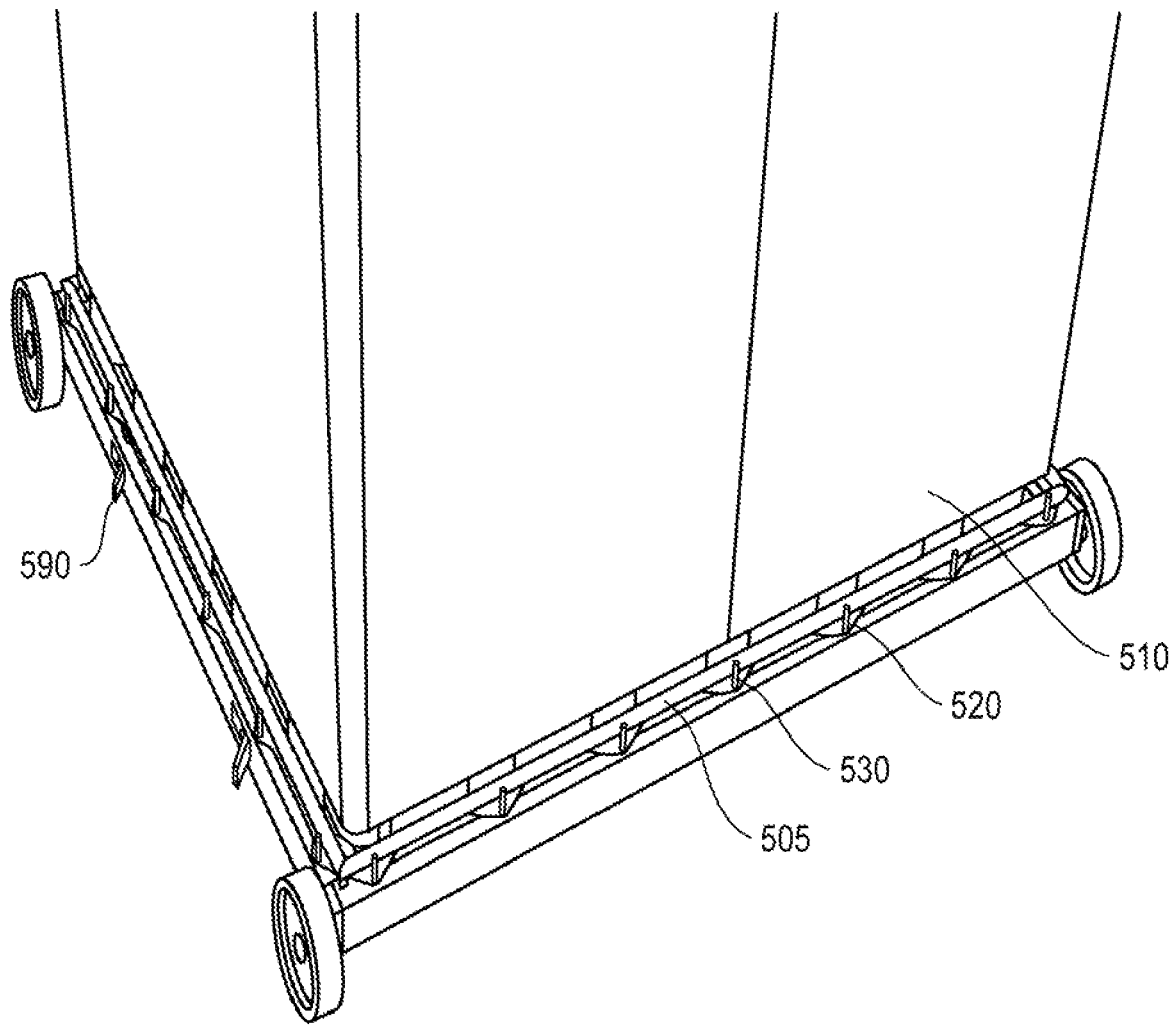
FIG. 5 shows (A) a CAD perspective of the dunnage platform bag attached to the transport base frame shows and (B) a close-up of the dunnage platform bag method of attachment to the transport base frame.
Figure 5B:
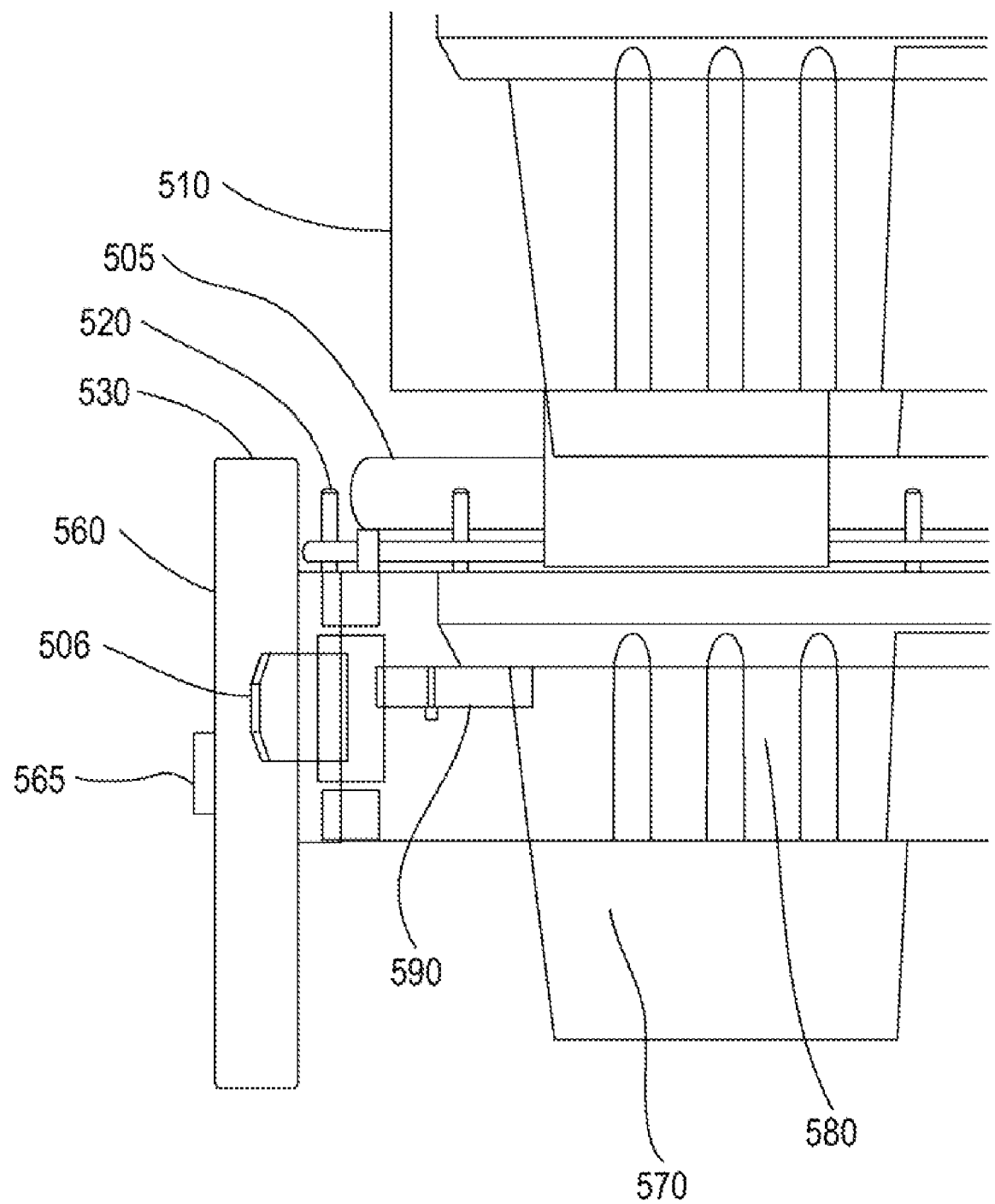

FIG. 5 shows (A) a perspective of the dunnage platform bag attached to a transport base frame and (B) a close-up cross section of the dunnage platform bag fastening to a transport base frame. FIG. 5A shows two of the four dunnage platform stop triggers 590 which can be positioned on either side of, and 250 mm from the front and 250 mm from the rear of the (1101 mm width side) of the transport base frame. The bag 510 is secured to the frame with the rope 530 sewn into the lower edge of the bag 510, which is drawn under the pipe frame 505 and secured with rope pegs 520. Dunnage platform stop trigger 590 holds the pallet in place. In FIG. 5B, the base frame is made of 'C' cross-section steel frame 580 to which each wheel 560 is attached through a socket shoulder screw 565. The bottom of the bag 510 is sewn or otherwise attached to rope pegs 520, which can be passed through rope 530, attached to the pipe frame 505 and the frame 580. A dunnage platform stop 590 mounted inside a 12 mm 'C' section frame holds the dunnage platform 570 in place and impedes it from being dispensed. A trigger 506 holds the dunnage platform stop 590 in place. When the trigger is released the dunnage platform stop 590 completely retracts into the 'C-section. In another embodiment of the invention, the bag 510 is secured to the pipe frame 505 by a clamping mechanism secured to the pipe frame where the clamping mechanism is able to clamp onto the bag material.

Figure 6A:
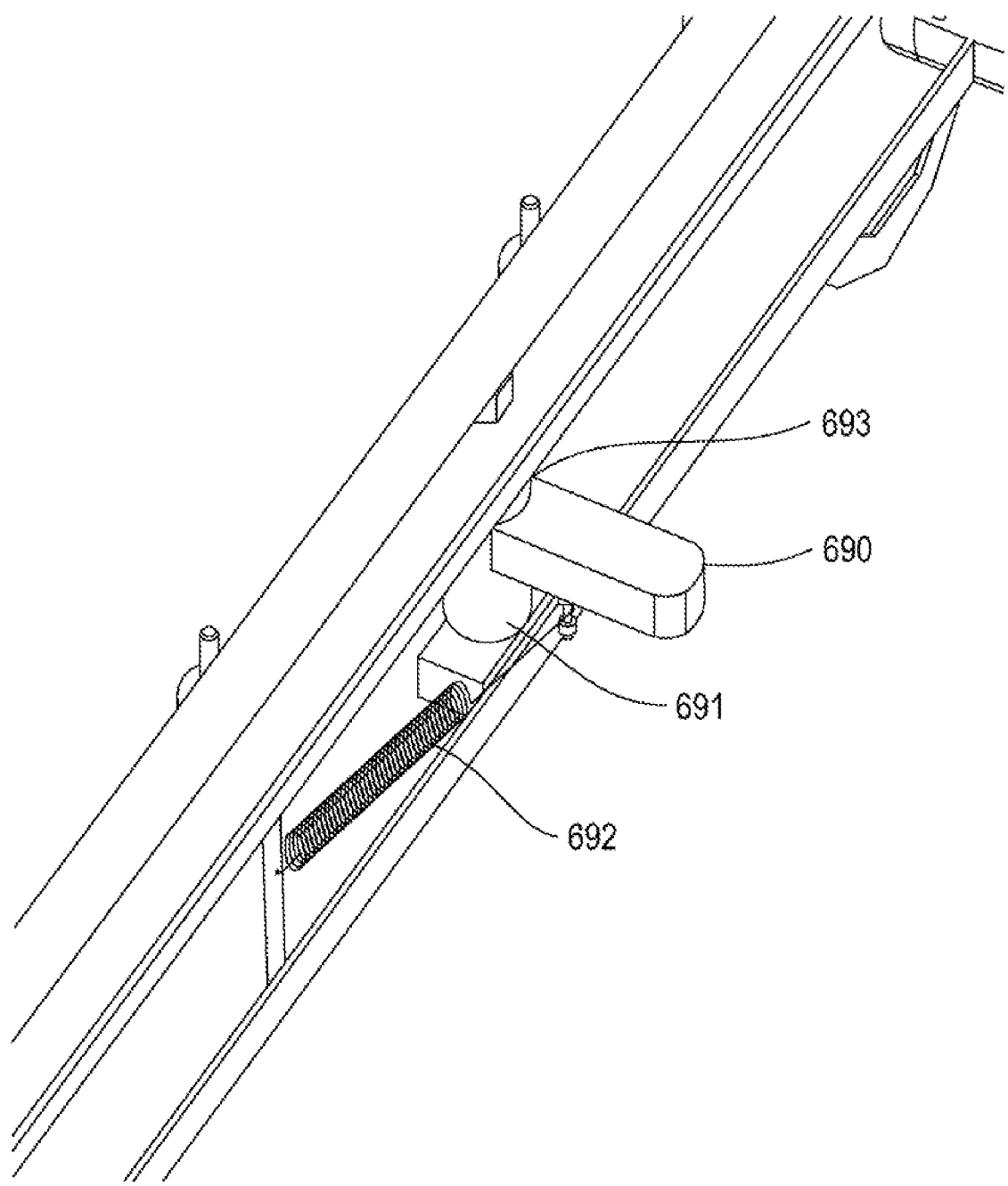
FIG. 6 shows a CAD drawing of the dunnage platform stop lever (A) external and (B) internal to the transport base frame.
Figure 6B:
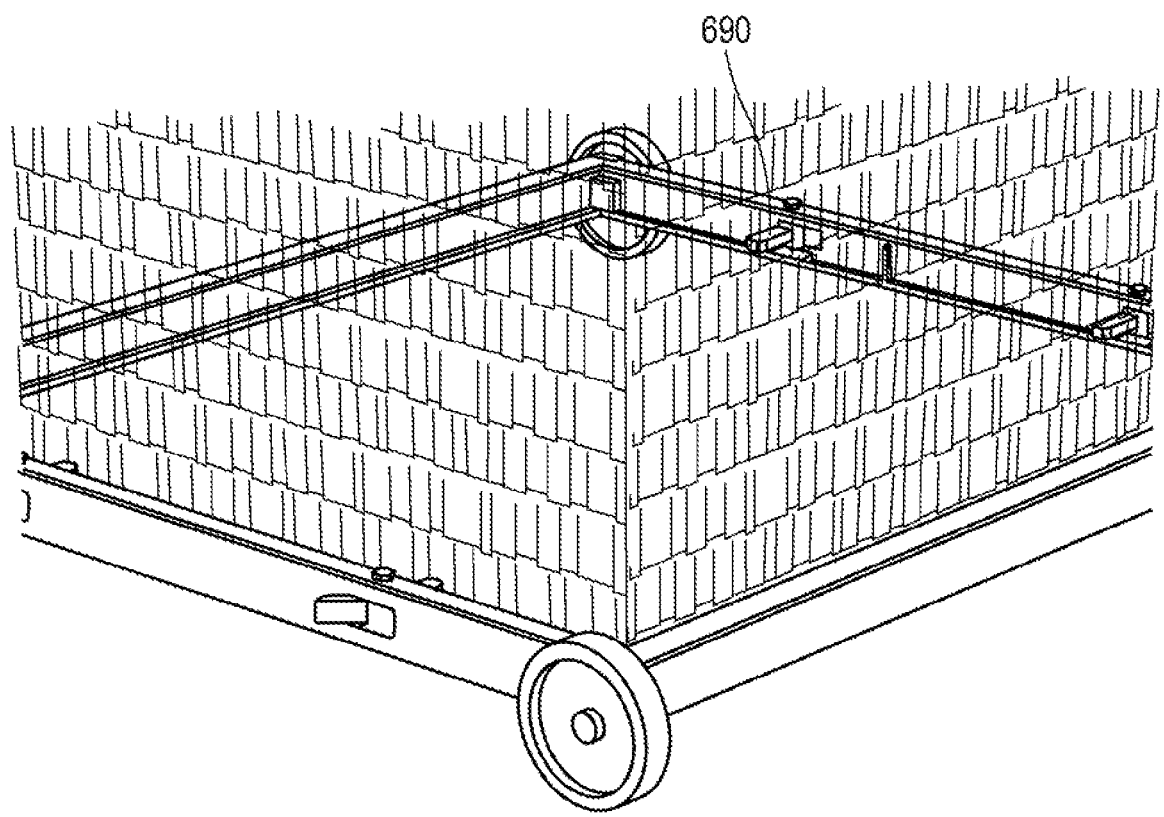
Figure 7A:
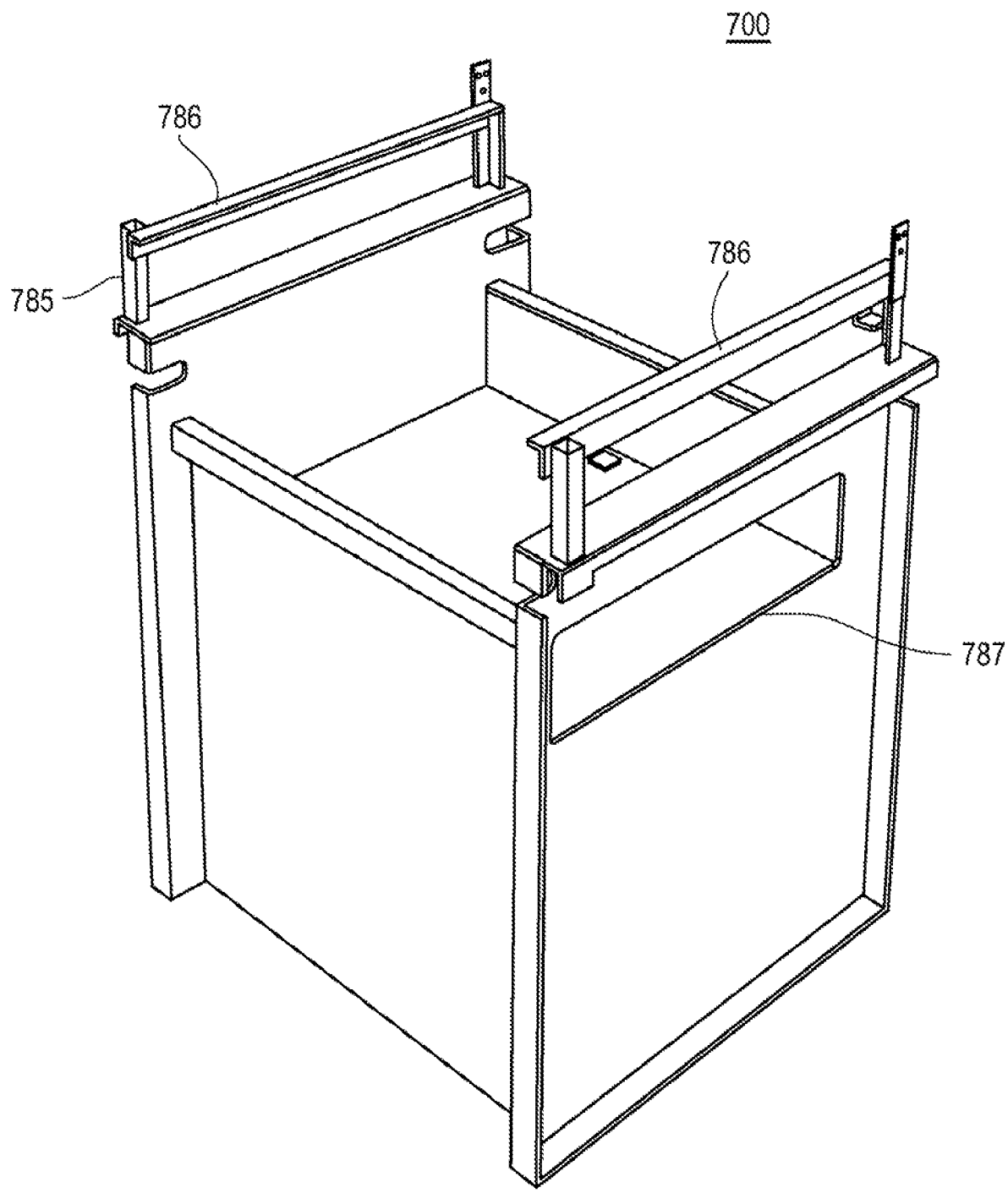
FIG. 7 shows a CAD drawing of the dispensing base frame where (A) the transport base frame wheels are positioned and (B) the gear mechanism, trigger strikers and dunnage platform release handle for dispensing.
Figure 7B:
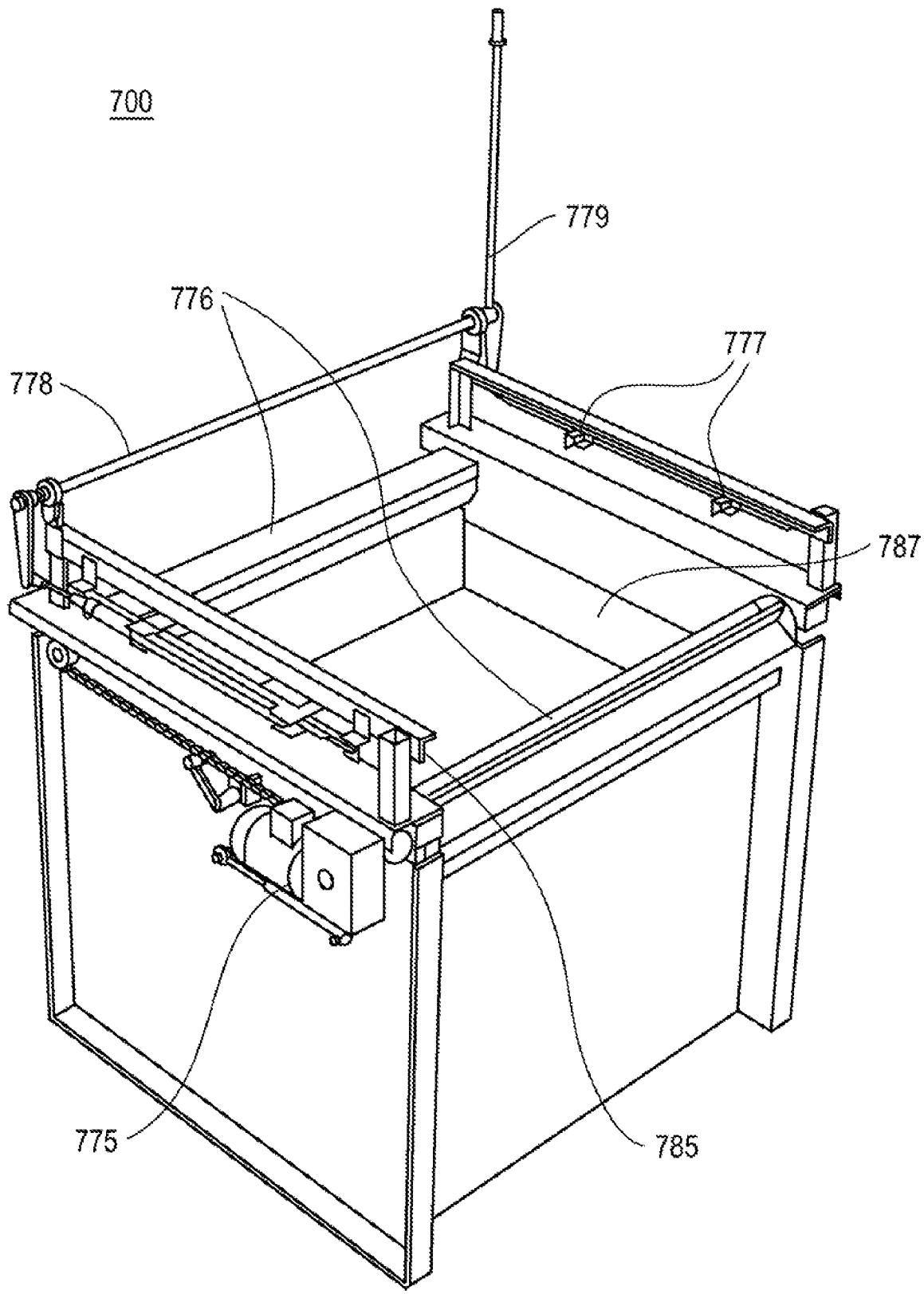
Figure 8A:
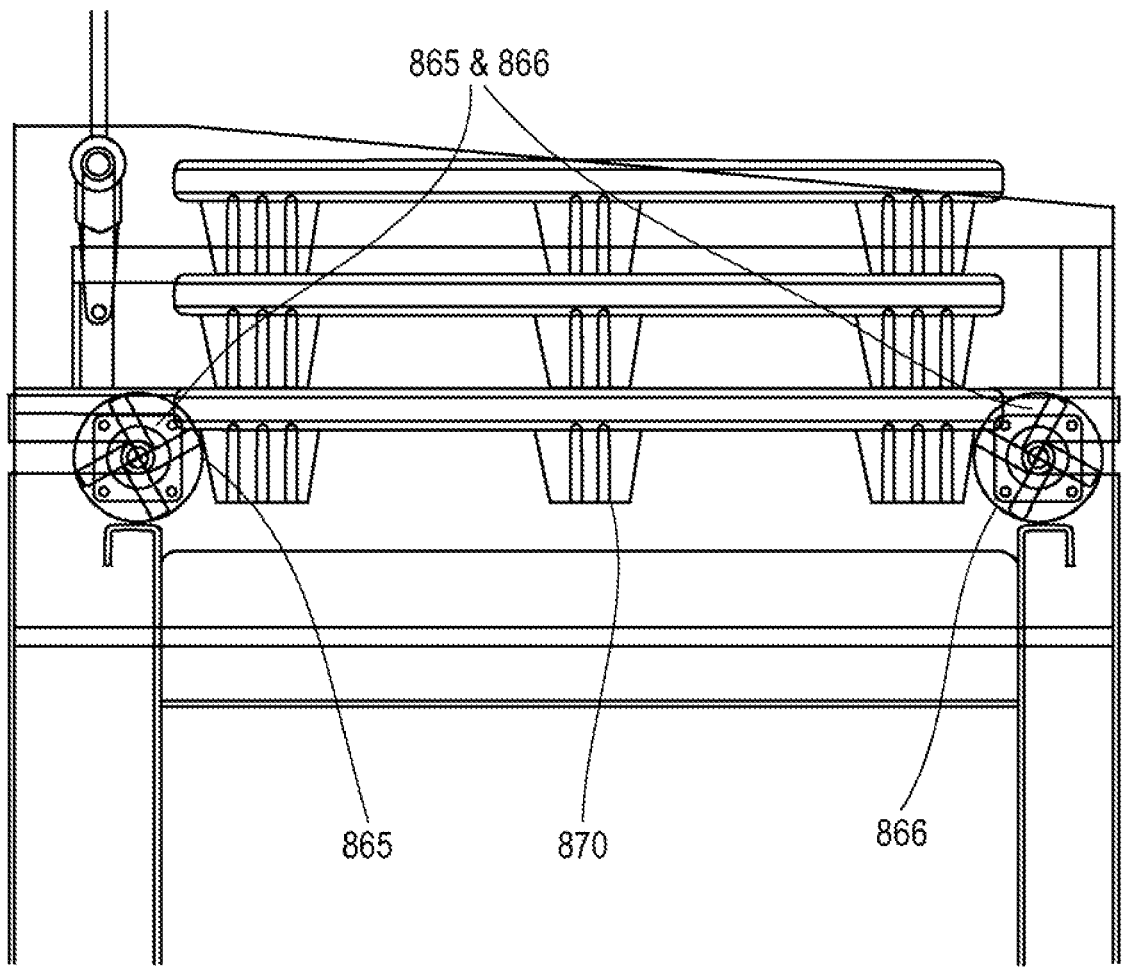
FIG. 8(A-D) shows a CAD drawing showing the guide wheels used for dispensing the dunnage platforms in different orientations.
Figure 8B:
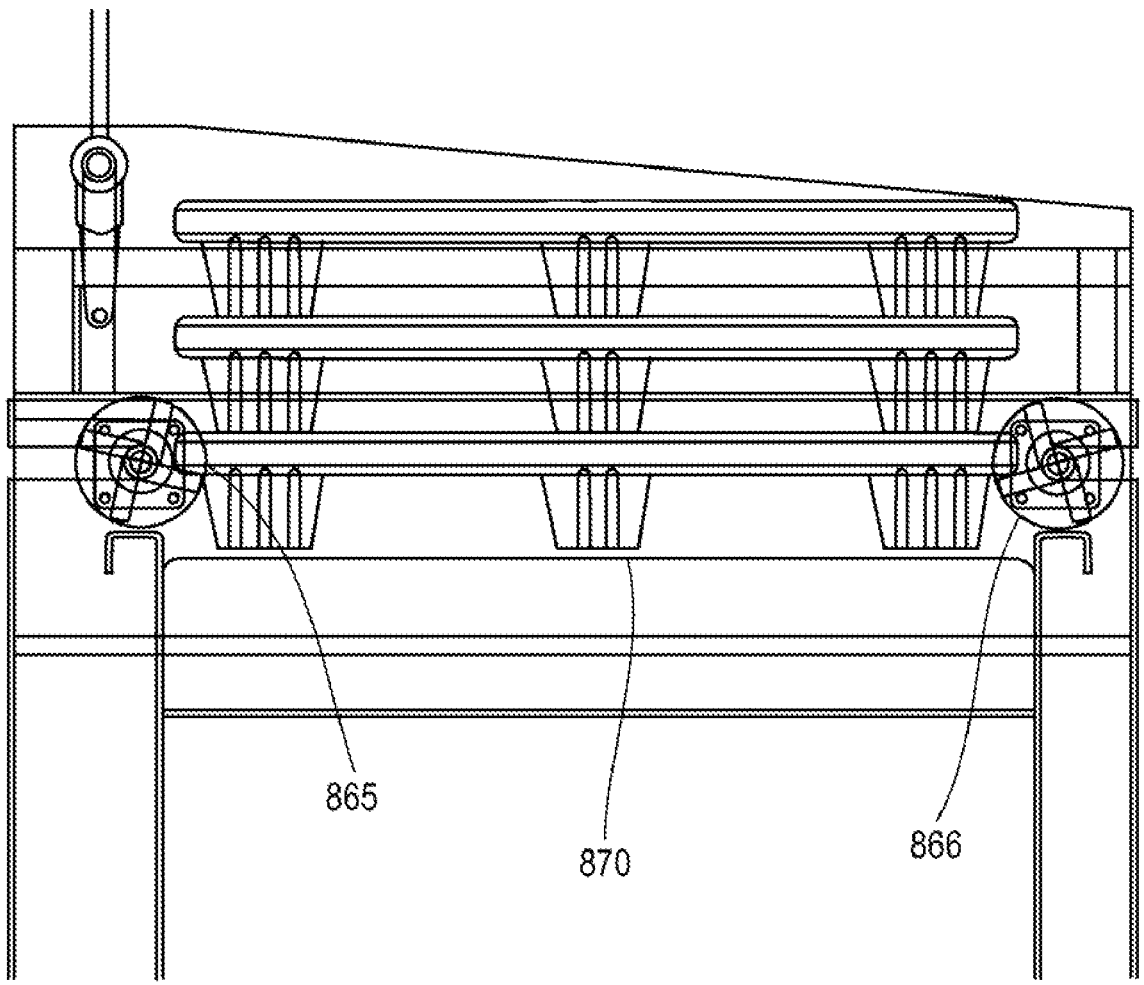
Figure 8C:
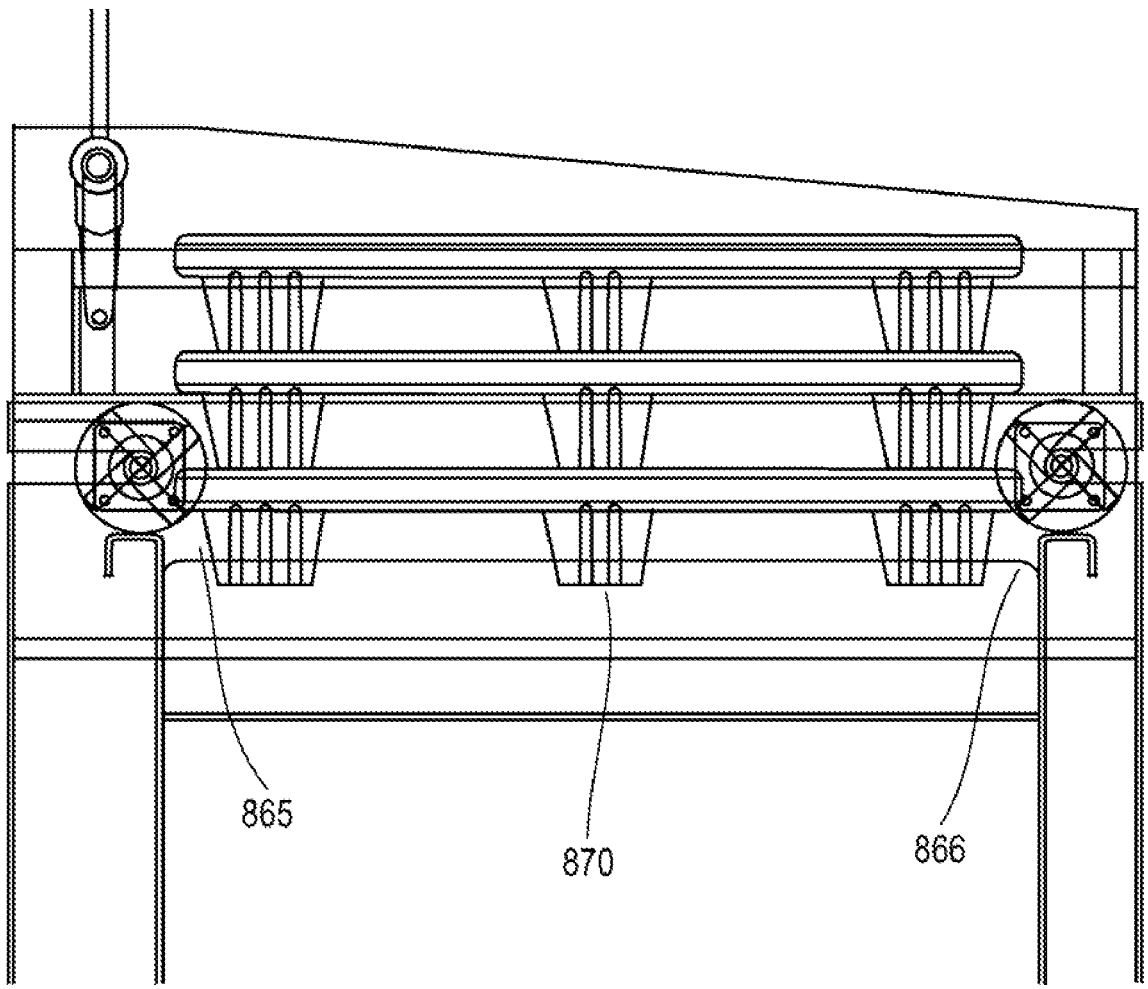
Figure 8D:
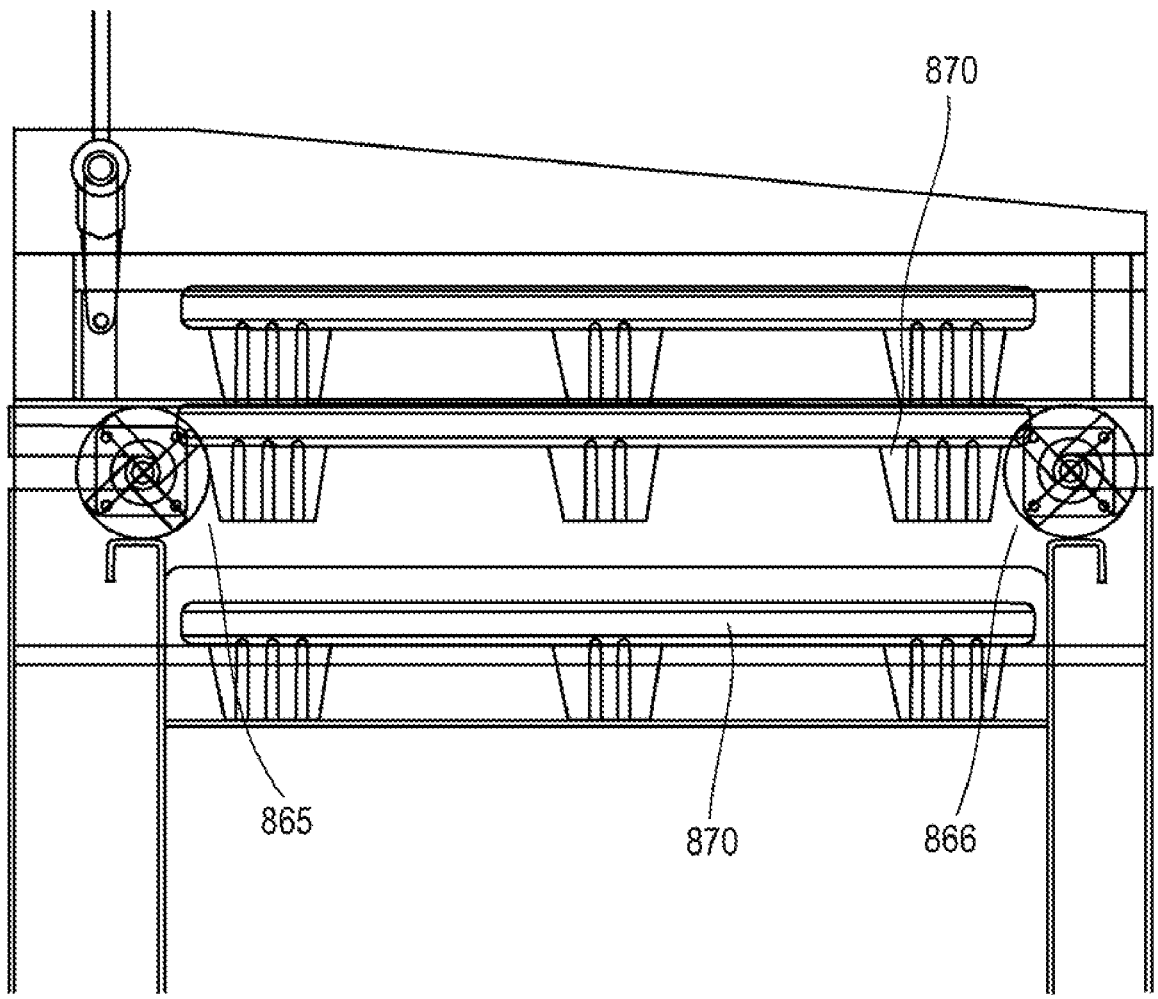

FIG. 6 shows a perspective of the transport base frame. FIG. 6A shows one embodiment of the invention where the dunnage platform stop 690 pivots on Teflon glacier bushes 691 and is restrained by a return spring 692. The dunnage platform stop lever swings on the axel bolt 693 to release a dunnage platform. FIG. 6B shows the dunnage platform stop 690, which holds the dunnage platforms in place (see also FIG. 9 for triggering through the dispensing base). FIG. 7 shows a perspective of the dispensing base frame 700. FIG. 7A shows the dispensing base mouth 785 where the transport base frame inserts into the dispensing base. The 'L' cross section steel (angle iron) 786 hold the wheels of the transport base above the exit cavity 787 where the dispensed dunnage platform can be retrieved. In this embodiment of the invention, the wheels can be mounted perpendicular to the width of the transport base and the wheels enter the mouth 785 and can be held in place by the 'L' section brackets. FIG. 7B shows the dispensing base 700 with the isolator drive 775, isolator wheels 776, trigger strikers 777, lever axel 778, exit cavity 787 and dunnage platform release handle 779. In alternative embodiments of the invention, rather than a motor, a ratchet of other mechanical system is used to drive the isolator wheels.

FIG. 8 shows a side view of the dunnage platform bag attached to a transport base frame and inserted in a dispenser base frame. FIG. 8A shows guide wheels 865 and 866 used for dispensing the dunnage platforms 870. Rectangular hollow tube is welded into a star configuration to form the guide wheels. The left hand side (LHS) 865 guide wheel turns clockwise while the right hand side (RHS) guide wheel 866, turns anticlockwise. Both the LHS 865 and the RHS guide wheels 866 can be chain guided in order to synchronize the motion. The guide wheels will tolerate 19 mm or ¾ inch variation in position of the dunnage platforms 870. FIG. 8B shows the guide wheels 865 and 866 after approximately a 50° rotation. The same dunnage platform 870 is still held by the guide wheels but the dunnage platform is lower and the next arm of the star is starting to turn into position to retain the next dunnage platform. FIG. 8C shows the guide wheels 865 and 866 after an additional approximately 30° rotation, where the dunnage platform 870 is about to be released by the guide wheels and the next arm of the star is in position to retain the next dunnage platform. FIG. 8D shows the guide wheels 865 and 866 after an additional approximately 10° rotation, where the dunnage platform 870 is released and the next arm of the star is holding the next dunnage platform.

Figure 9A:
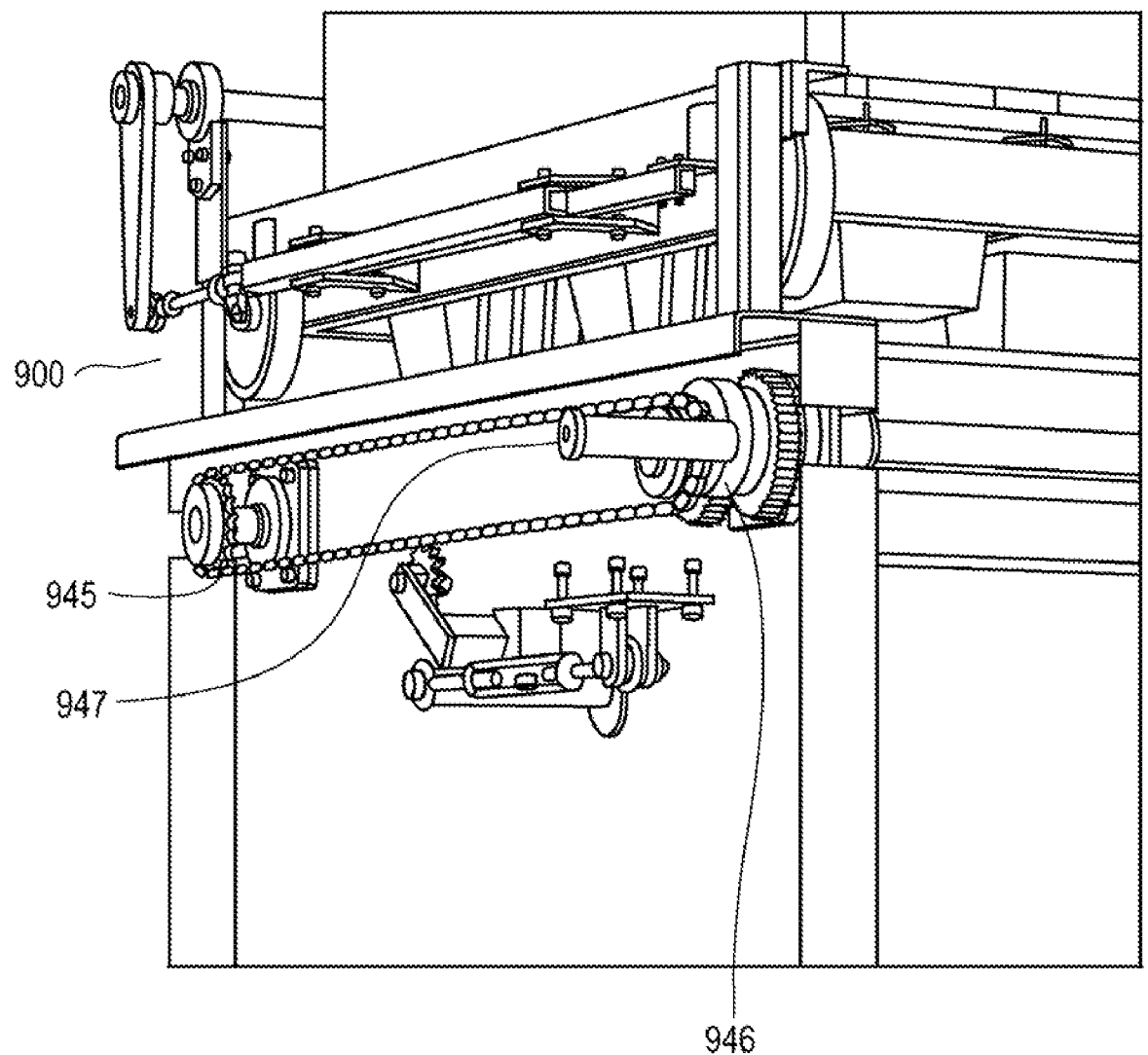
FIG. 9(A-C) show CAD drawings of the gear and chain used to drive the guide wheels shown in FIG. 11.
Figure 9B:
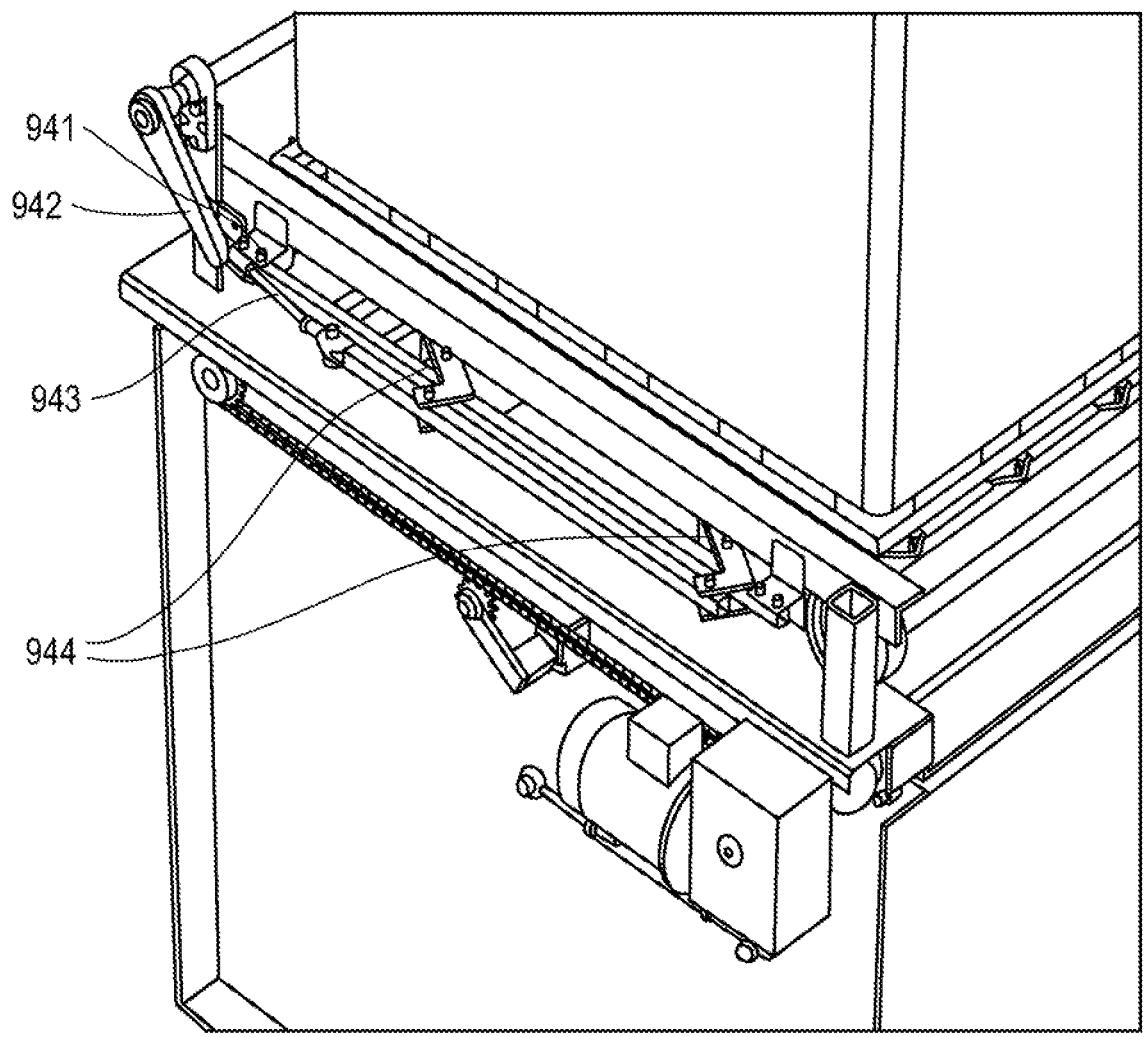
Figure 9C:
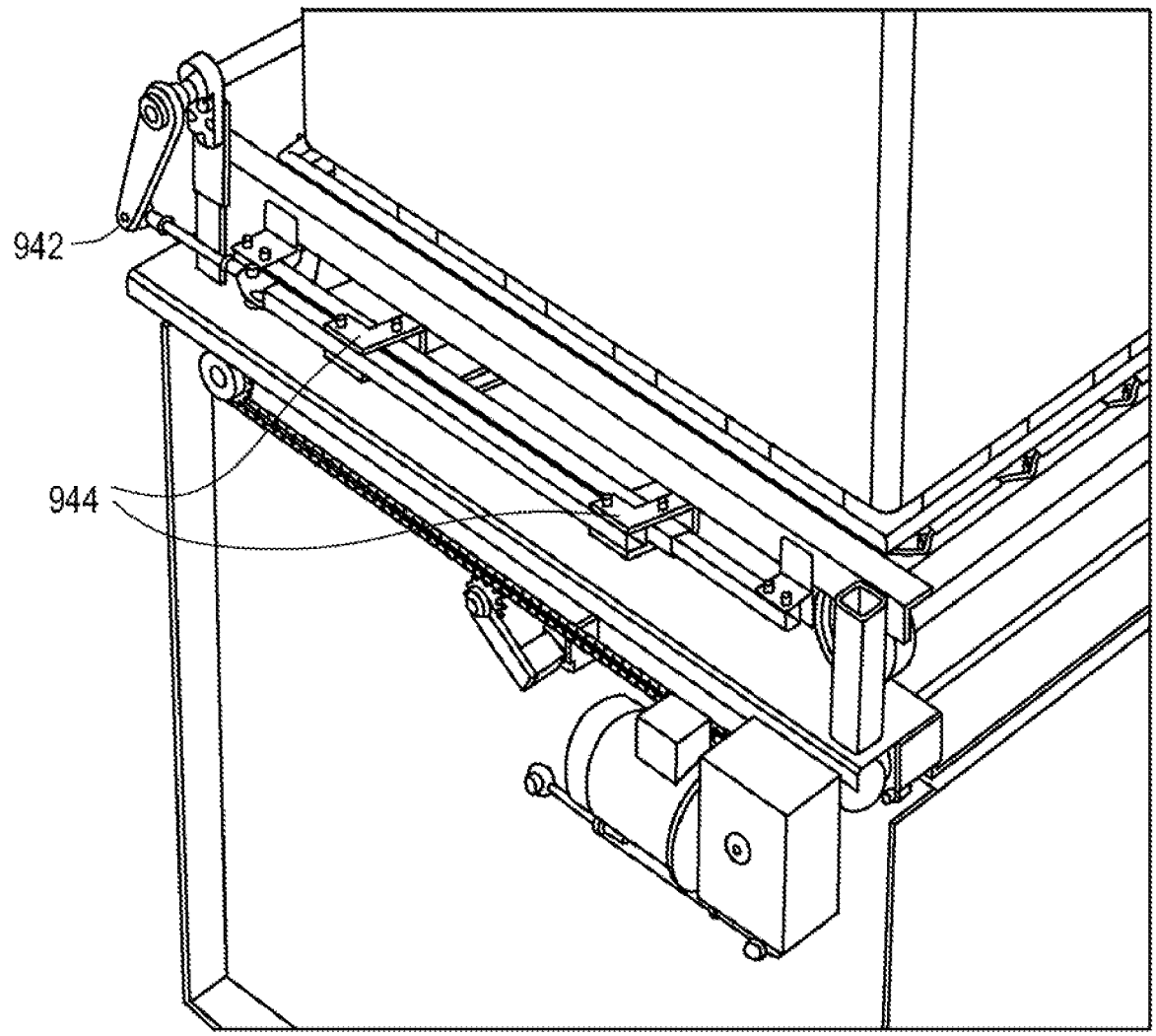
Figure 10A:
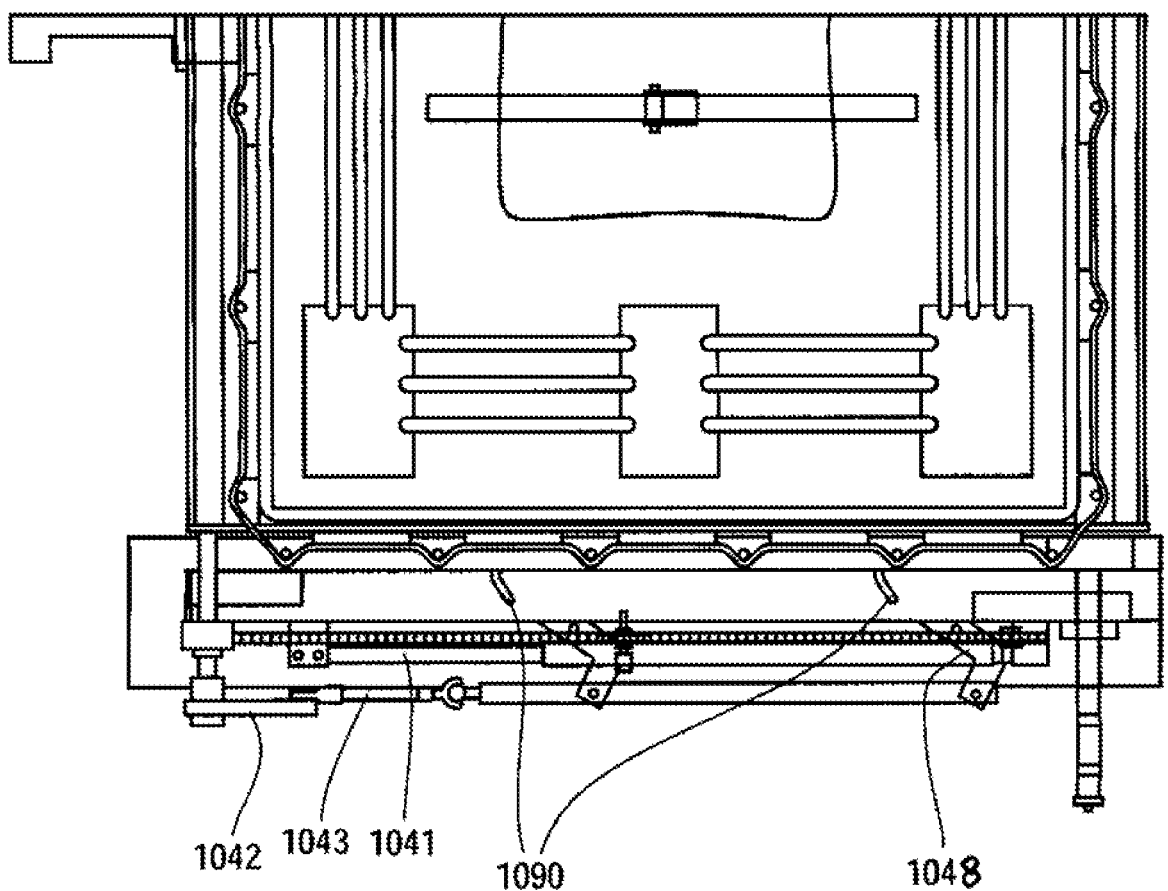
FIG. 10(A-C) show CAD drawings of the dispensing base frame with the transport base frame wheels showing the position of the trigger strikers in different orientations.
Figure 10B:
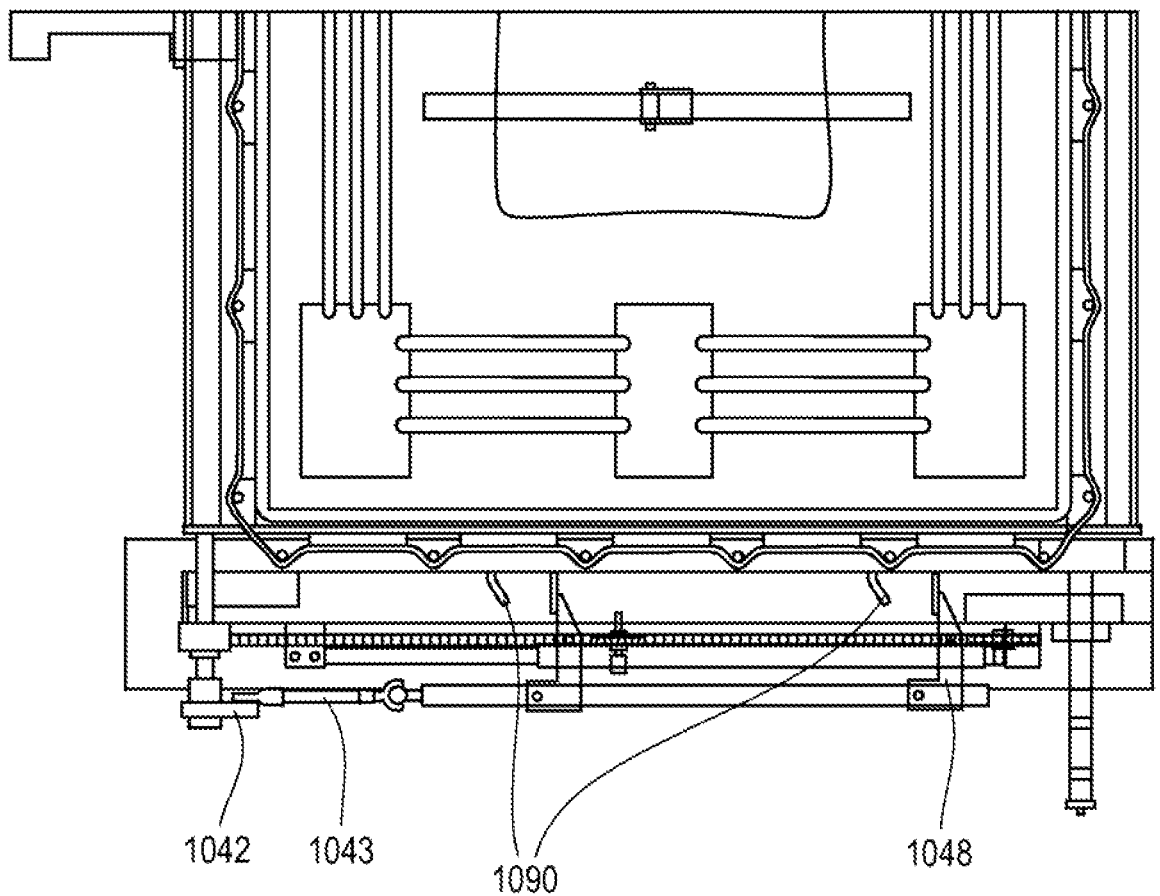
Figure 10C:
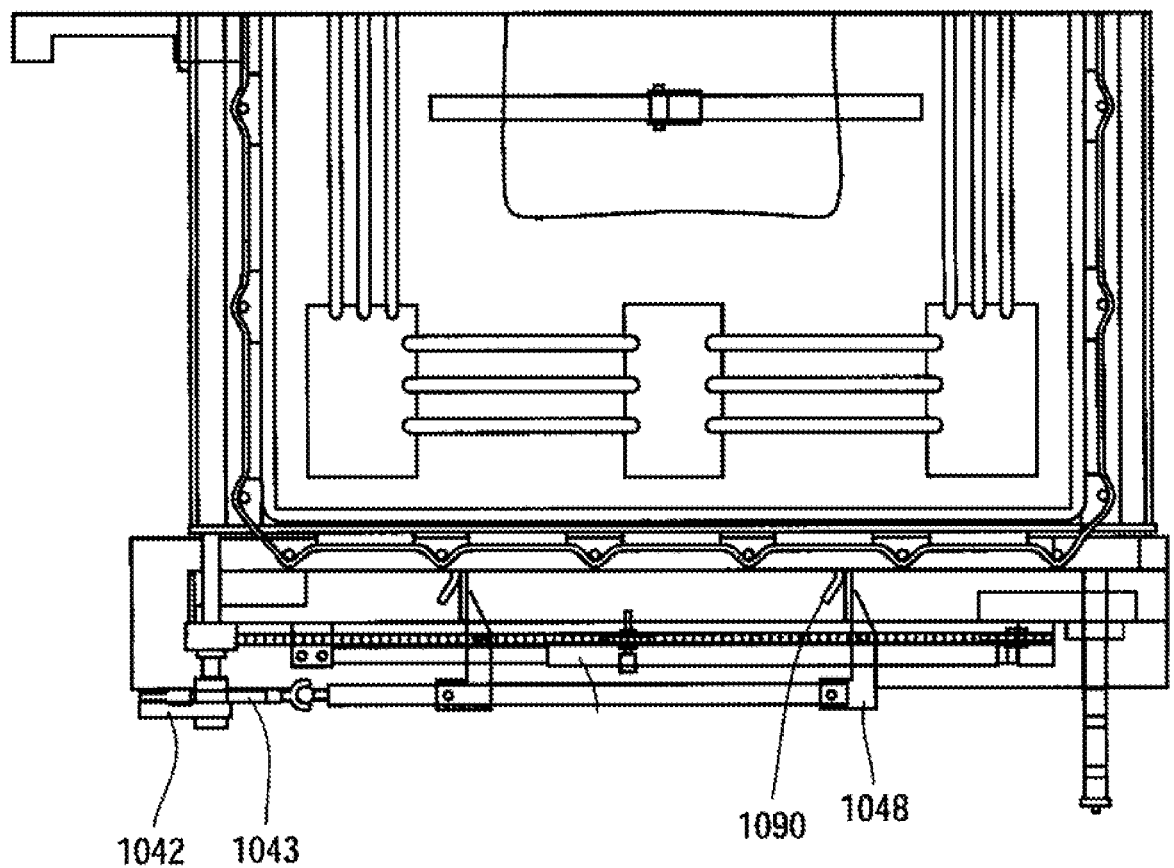

FIG. 9 shows a perspective of one embodiment of the invention where the dunnage platform bag attached to a transport base frame and inserted in a dispenser base frame. FIG. 9A shows the gear 946 and chain 945 used to drive the guide wheels. In one embodiment of the invention a motor is used to turn the spigot 947 and drive the gears and thereby the chain to deliver a dunnage platform. In another embodiment, a ratchet can be used to turn the spigot. The guide wheels can be mounted on only one side of the dispensing base frame 900. FIG. 9B shows the trigger activation mechanism (see also FIG. 7B). In the base release position, the striker pivots 944, attached to the slide rail 941 can be moved via a linkage 943, connected to a pivot arm 942 and the striker pivots can be retracted away from the dunnage platform stop strikers to allow withdrawal of the dunnage platform bag and transport base from the dispenser. The striker pivots 944 when not in the base release position (see FIG. 9C) can engage the dunnage platform stop triggers (see 590 FIG. 5A). As the linkage 943 moves, the slide rail 941 and the striker pivots 944 move toward the direction of the lever 942 axel (see also 778 FIG. 7B). When the release handle is upright, the dunnage platform stop trigger 590 holds the dunnage platforms from dropping down. Pulling downward on the dunnage platform release handle 779 turns the lever 942 which swings the linkage 943 bringing the striker pivots in contact with the triggers 590 thereby releasing the next dunnage platform. FIG. 10 shows an overhead view of the dunnage platform bag attached to a transport base frame and inserted in a dispenser base frame. FIG. 10A shows the strikers 1048 in the retracted position to allow clearance for the dunnage platform bag and transport base to be loaded or removed. The strikers 1048, attach to the slide rail 1041 can be moved via a linkage 1043, connected to a pivot arm 1042. FIG. 10B shows the strikers 1048 in the perpendicular position when the dunnage platform release handle is in the upright position and the strikers 1048 are rotated into a position ready to contact the striker release triggers 1090. FIG. 10C shows the strikers 1048 contacting the striker release triggers 1090 when the dunnage platform release handle is lowered.

Figure 11:
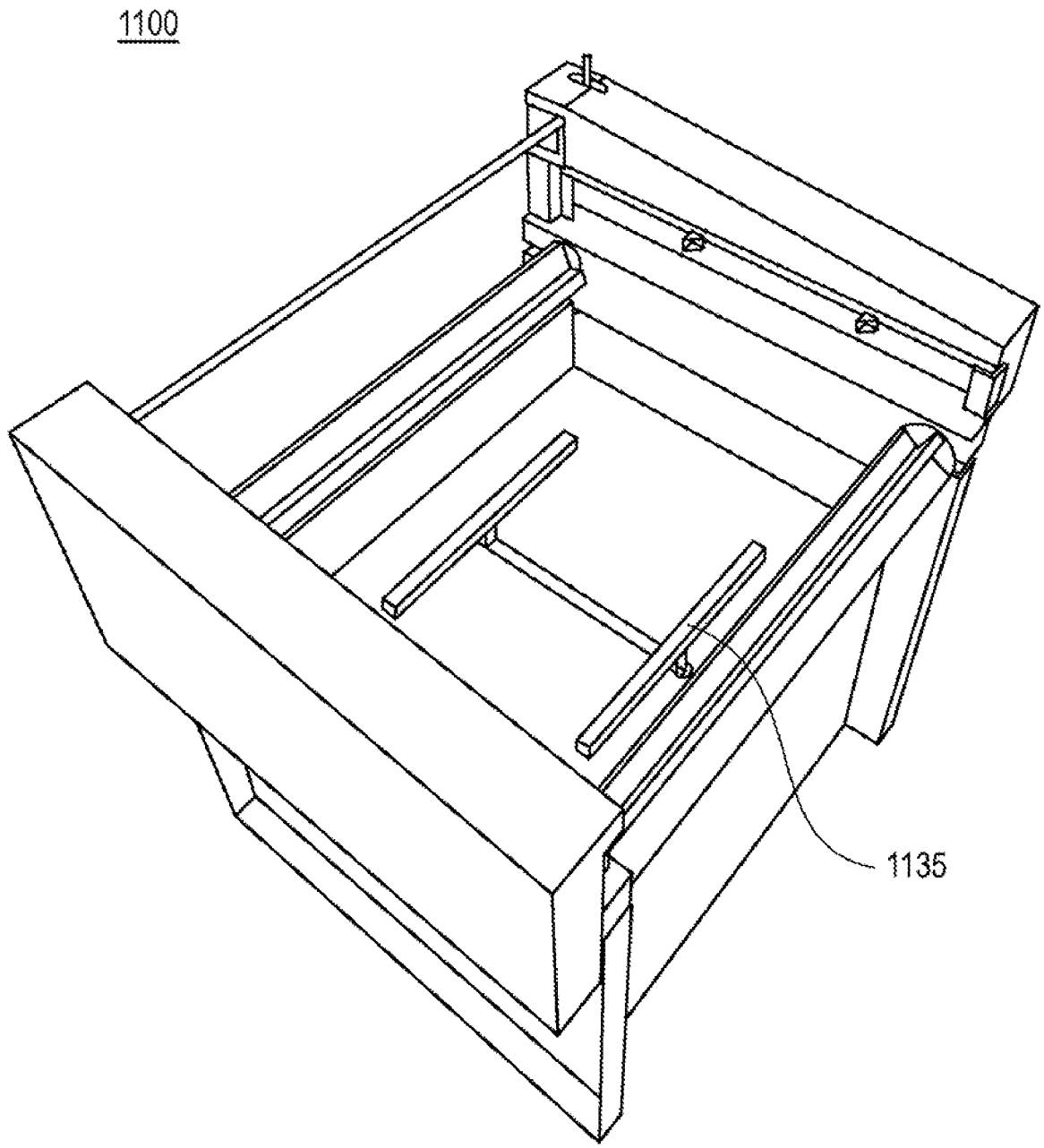
FIG. 11 show CAD aerial projections of the reloading base frame and the lifting bar used to force the dunnage platform up into the dunnage platform bag.
Figure 12A:
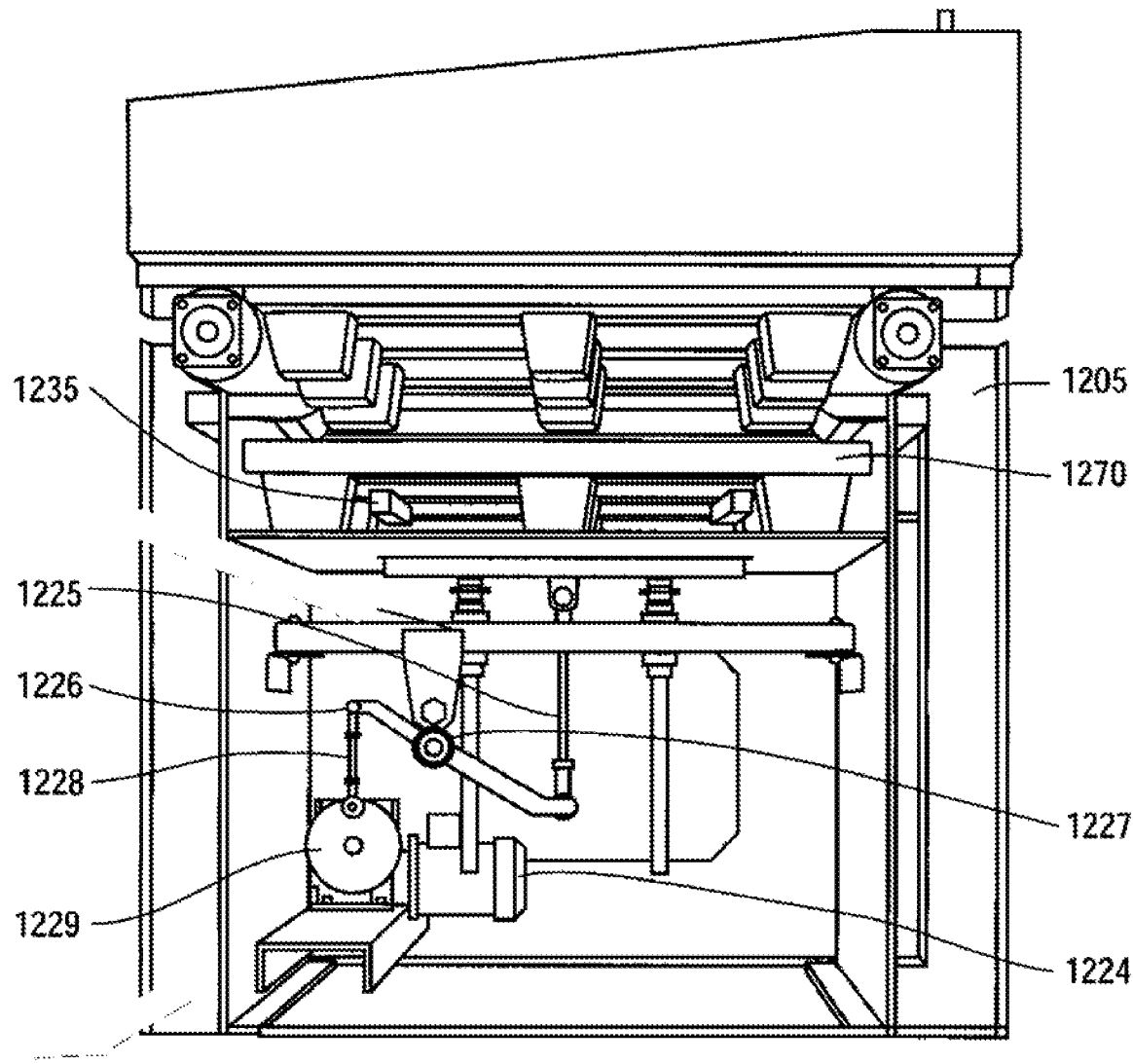
FIGS. 12(A and B) show a CAD drawing of a side view of the reloading base frame with the tension link in different orientations.
Figure 12B:
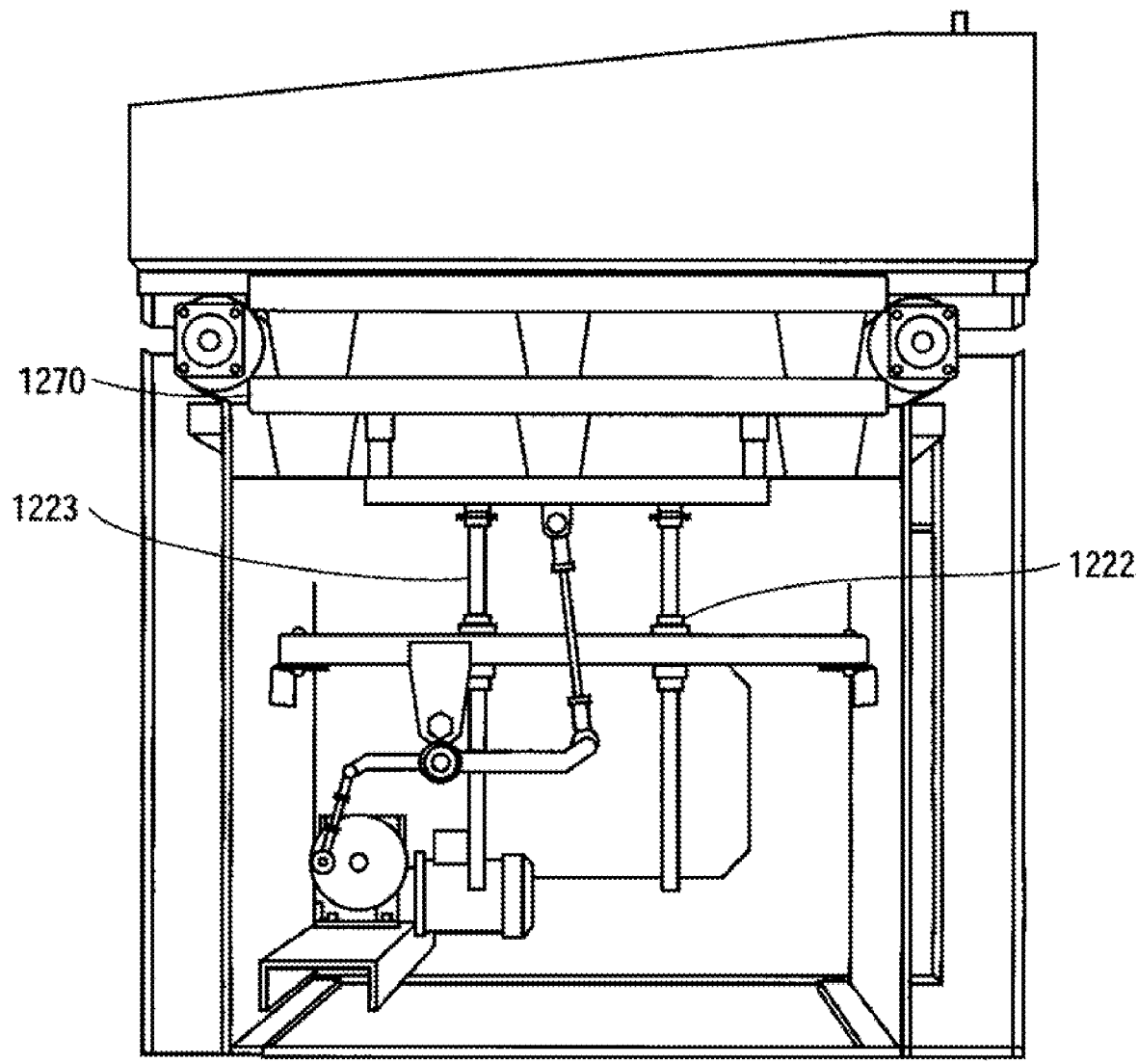
Figure 13:
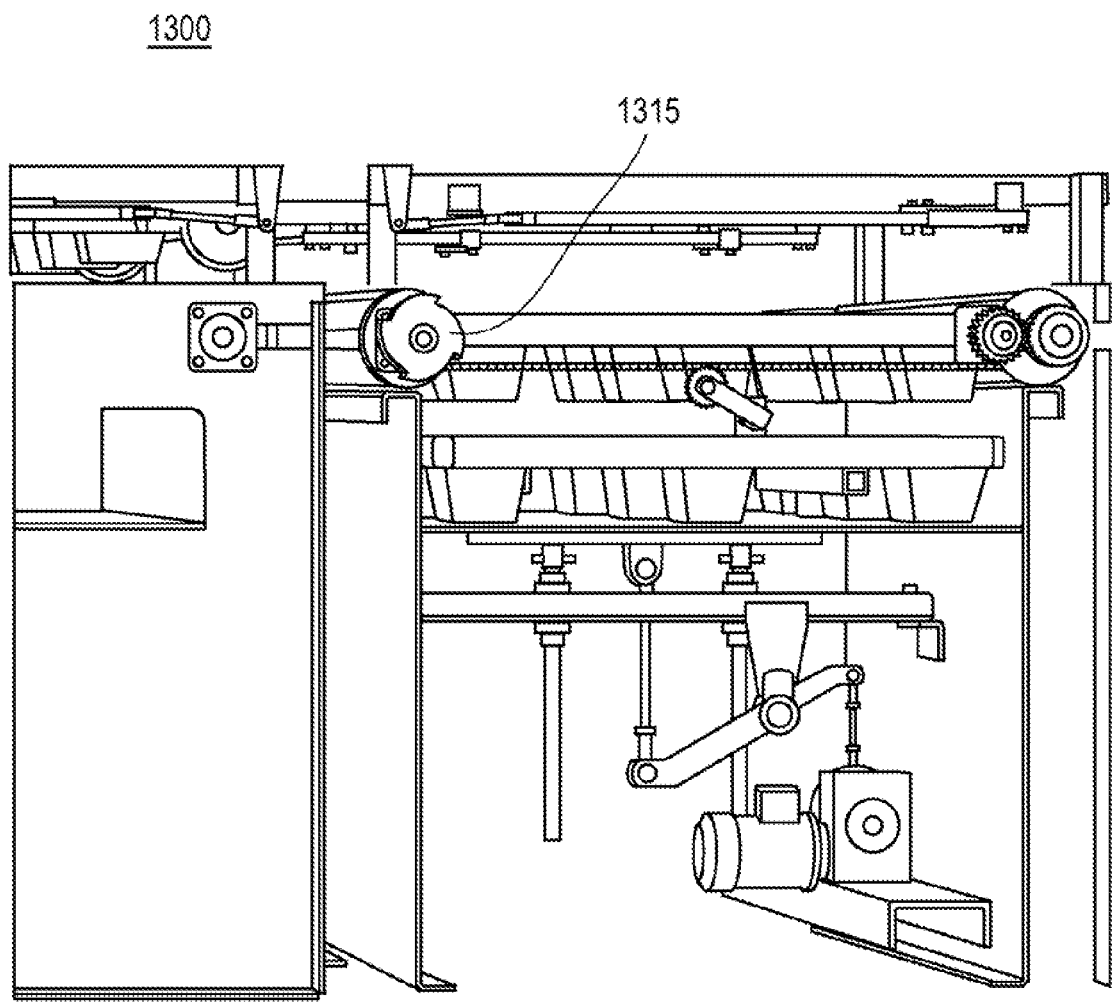
FIG. 13 shows a CAD drawing of the sprocket and ratchet used to hold the dunnage platform in place once it is lifted.

In one embodiment of the invention, the dunnage platforms can be re-loaded using a reloading base 1100. In one embodiment of the invention, the reloading base frame 1100 is identical in dimension to the dispensing base frame (see 700 FIG. 7). FIG. 11 shows an aerial projection of the reloading base frame 1100 and the lifting bar 1135, which is used to force the dunnage platform up into the bag. FIG. 12 shows a side view of the reloading base frame 1200, where the lifting bar 1235 is connected by a compression link 1225, a lever 1226 with a pivot point 1227, and a tension link 1228 to a crank wheel 1229 driven by a motor 1224. The motor 1224 turns the crank wheel 1229, which is coupled via a universal joint to the tension link 1228 which traces out a circular trajectory, driving the lever 1226 up and thereby the lifting bar down for loading a dunnage platform onto the lifting bar (FIG. 12A). The dunnage platform 1270 is accepted into the space shown in the reloading base frame 1205 without the need for the lifting bar 1235 to drop lower than shown in FIG. 12A as the middle section of the lifting bar 1235 accepts the middle leg of the dunnage platform. Continuing the elliptical trajectory of the tension link 1228 mounted at the crank 1229, the lever 1226 is driven down and thereby the compression link 1225 forces the lifting bar 1235 up. FIG. 12B shows the lifting bar connected to a linear slide 1223 with linear bearings and two linear bushes 1222 to give stability and keep the motion vertical, thereby evenly raising the inserted dunnage platform 1270 back into the bag. FIG. 13 shows that the dunnage platform once it is lifted into place is held by a one-way sprocket and ratchet 1315. In an alternative embodiment a foot pedal can raise the lifting bar. In an alternative embodiment, pneumatic air pressure can be used to drive a lever to raise the lifting bar. In an alternative embodiment a jack can supply mechanical energy to raise the lifting bar.

Figure 14A:
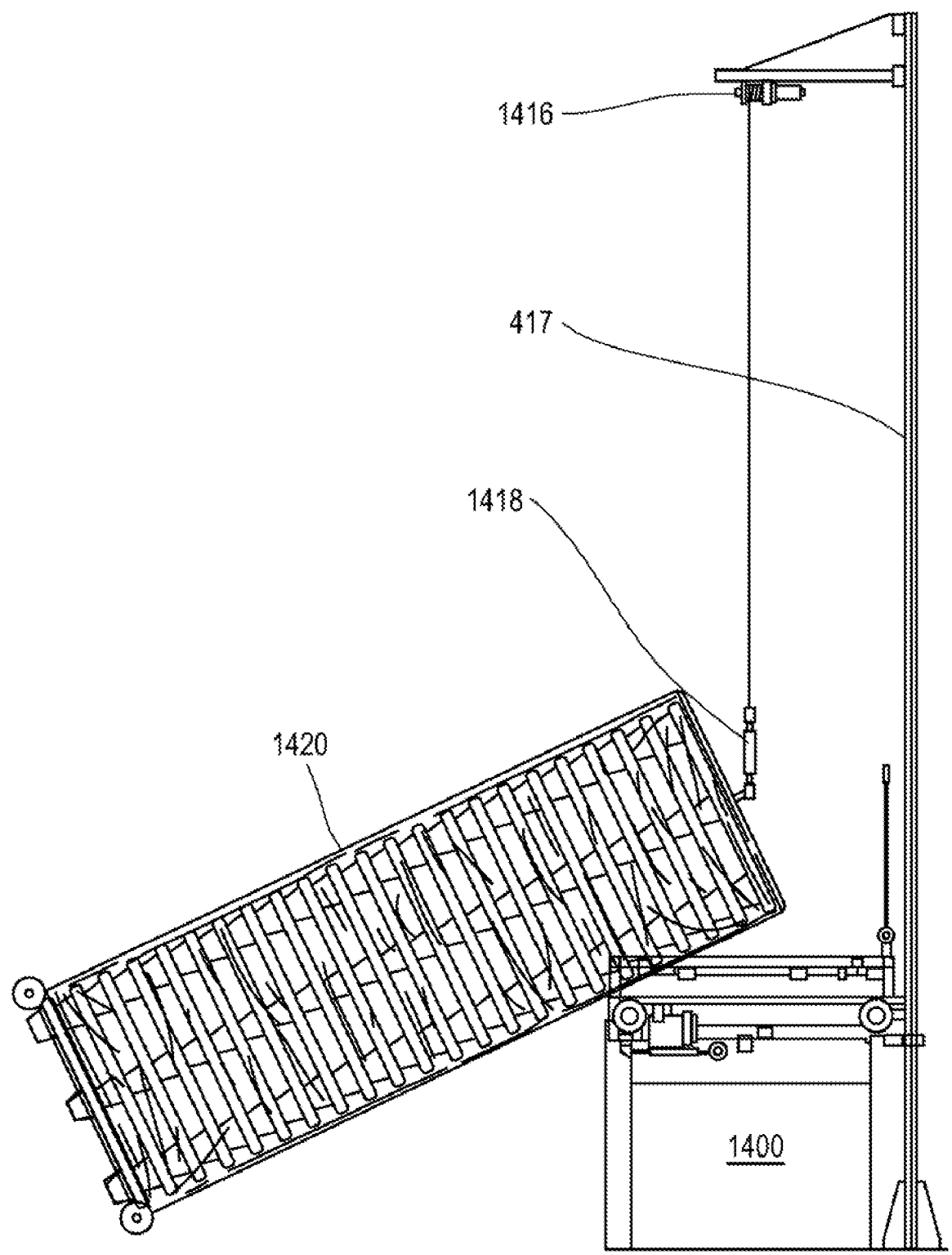
FIG. 14(A-D) show CAD drawings of a dunnage platform bag being loaded onto a dispensing base frame in different orientations.
Figure 14B:
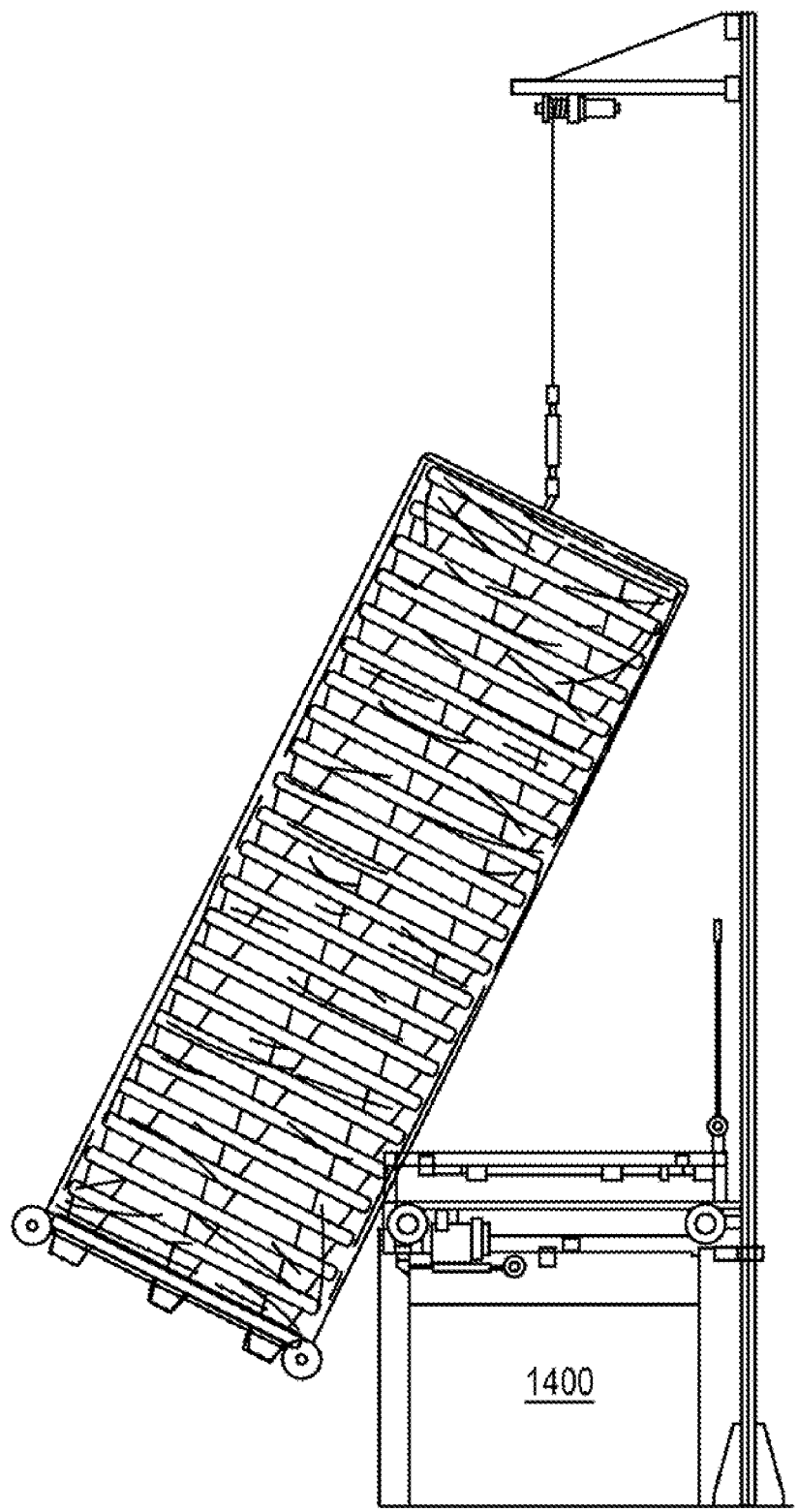
Figure 14C:
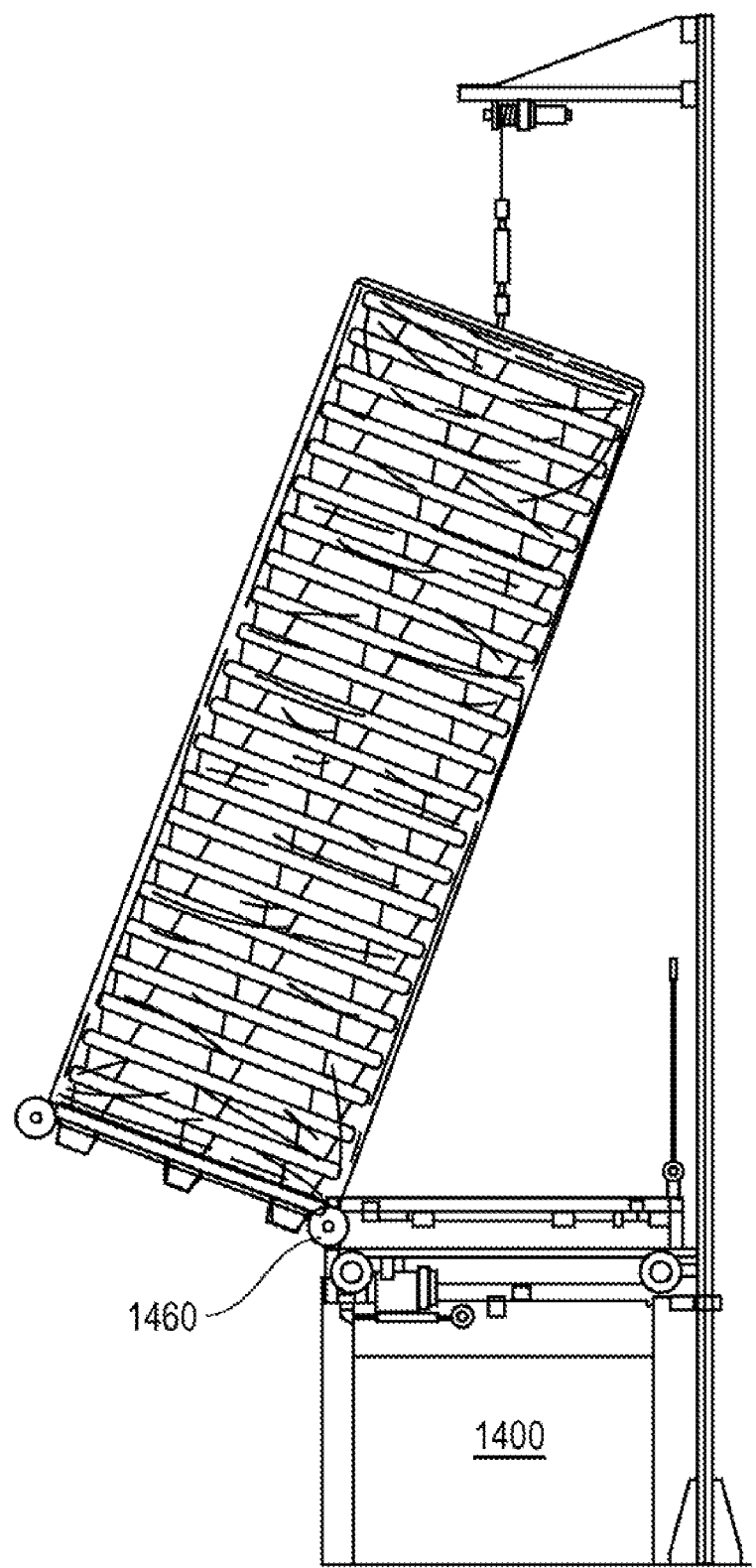
Figure 14D:
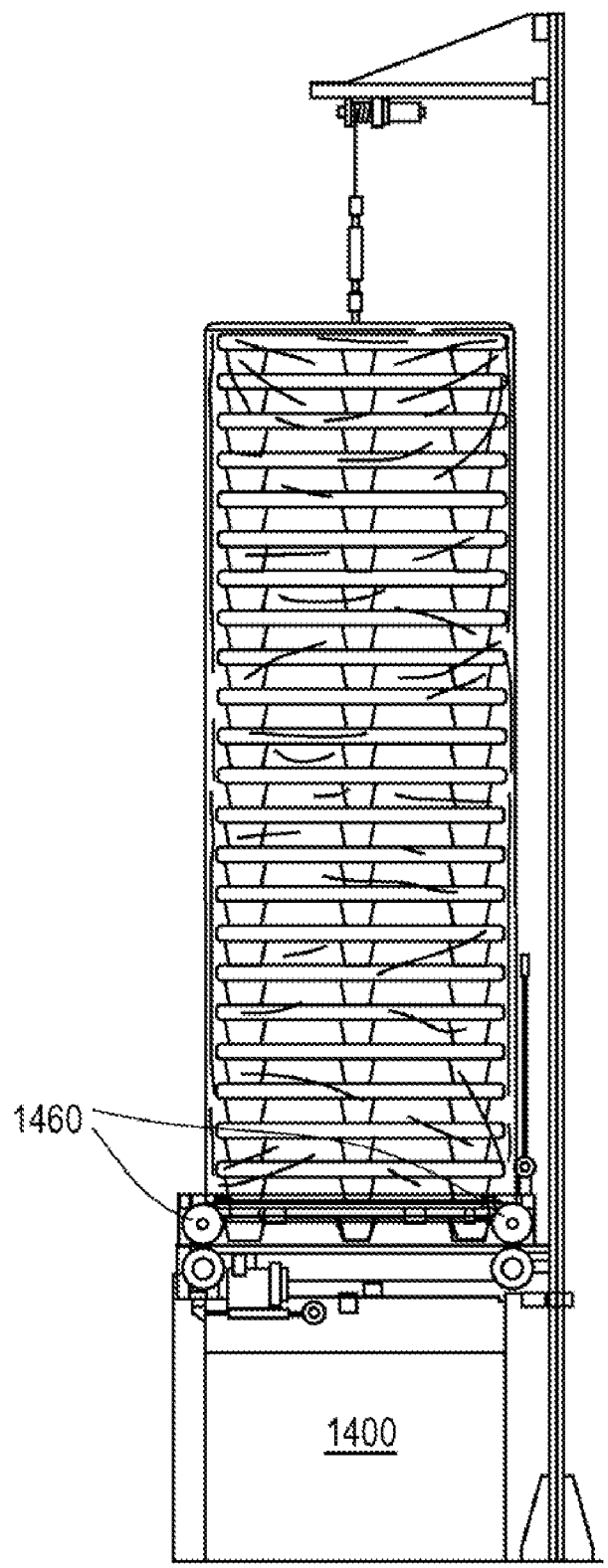

In an embodiment of the invention, the bag attached to the transport base can be loaded onto the dispensing base 700. In another embodiment of the invention, the bag attached to the transport base can be loaded onto the reloading base 1100. In another embodiment of the invention, the bag attached to the transport base can be loaded onto the combined dispensing base and reloading base. FIG. 14 shows a diagram of the bag 1420 attached to the transport base being raised with a hoist 1416 and spring 1418 attached to a boom pipe 1417 onto the dispensing base 1400. FIG. 14A shows the bag 1420 and transport base tilted and leaning on the dispensing base 1400 so that the spring tensioning connection 1418 can be attached to the hook. FIG. 14B shows the bag and transport base after it has been hoisted off the ground and still leaning on the dispensing base 1400. FIG. 14C shows the bag and transport base after hoisting where the wheel 1460 of the transport base is aligned with the mouth of the dispensing base 1400. FIG. 14D shows the bag and transport base after the wheels 1460 roll the bag and transport base into the dispensing base 1400.

Figure 15A:
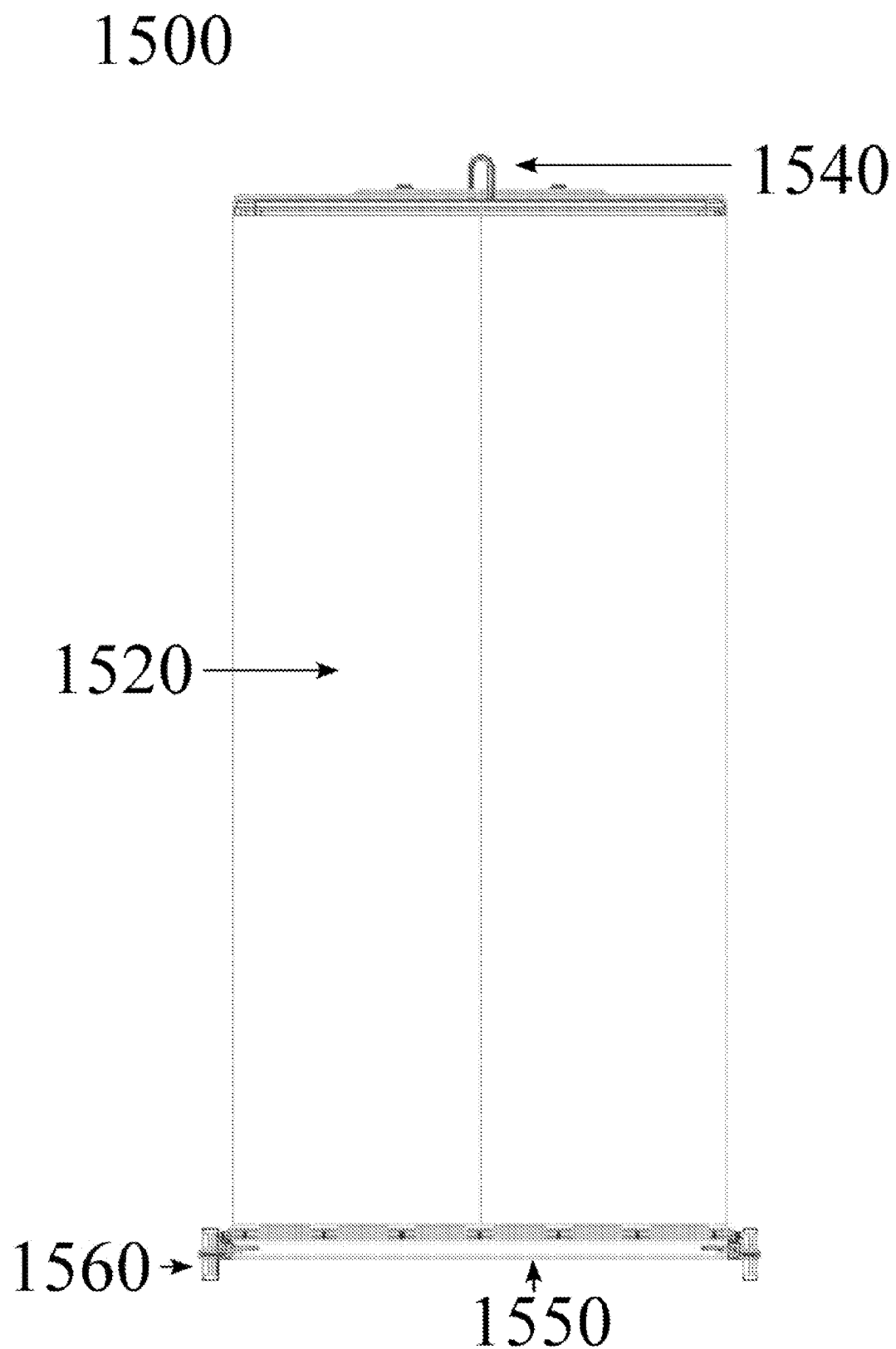
FIG. 15(A-E) show CAD drawings of an empty dunnage platform bag being folded onto its dispensing base frame in different orientations.
Figure 15B:
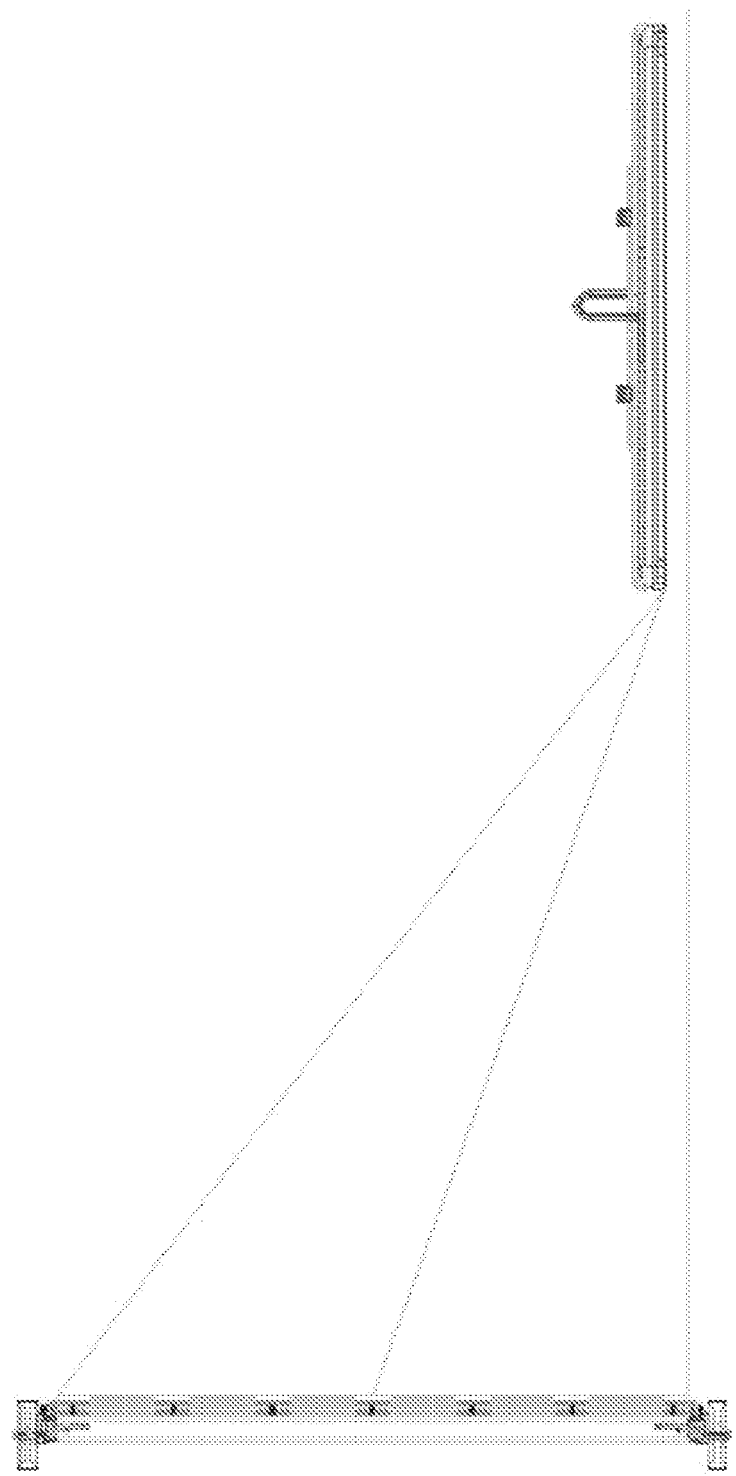
Figure 15C:
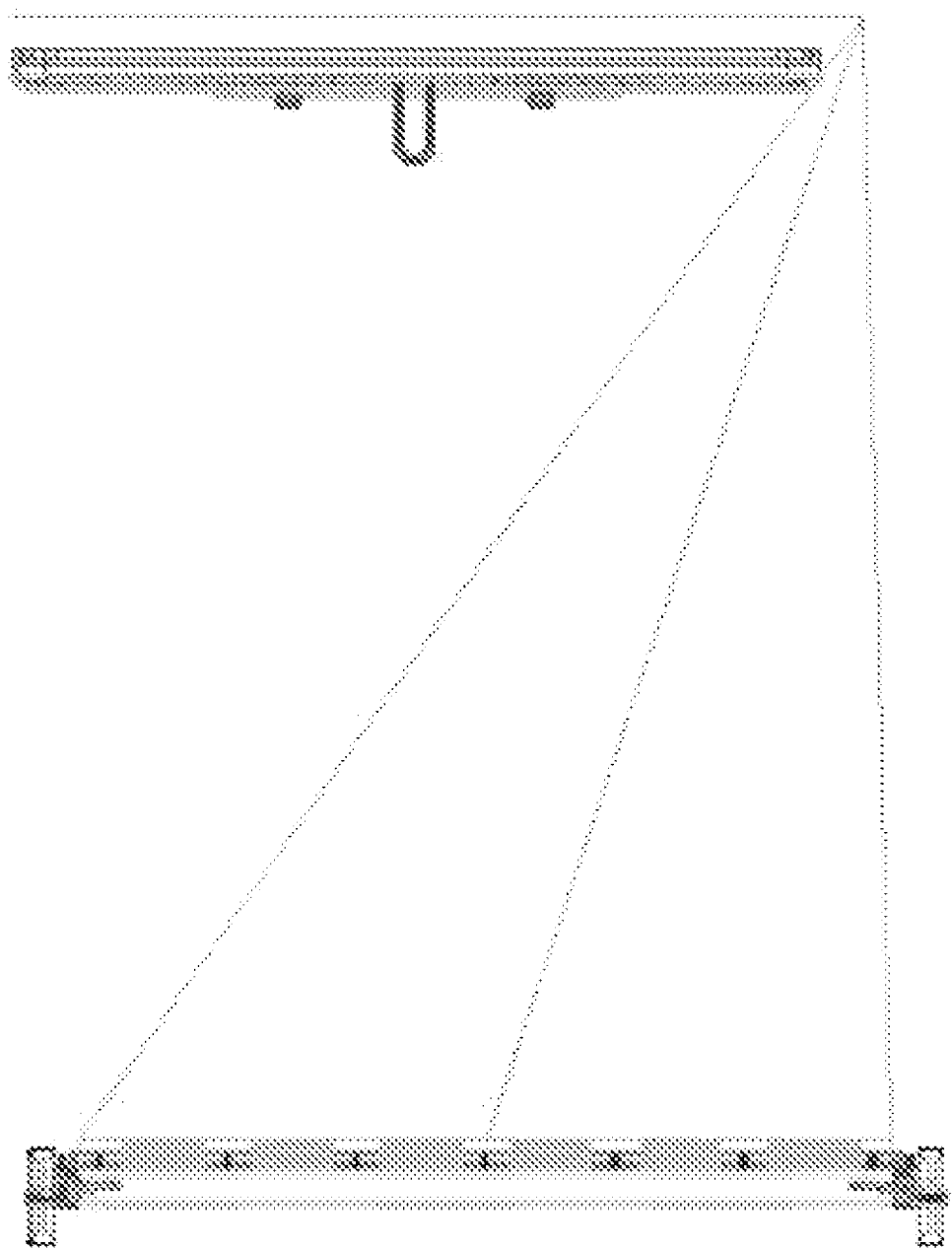
Figure 15D:
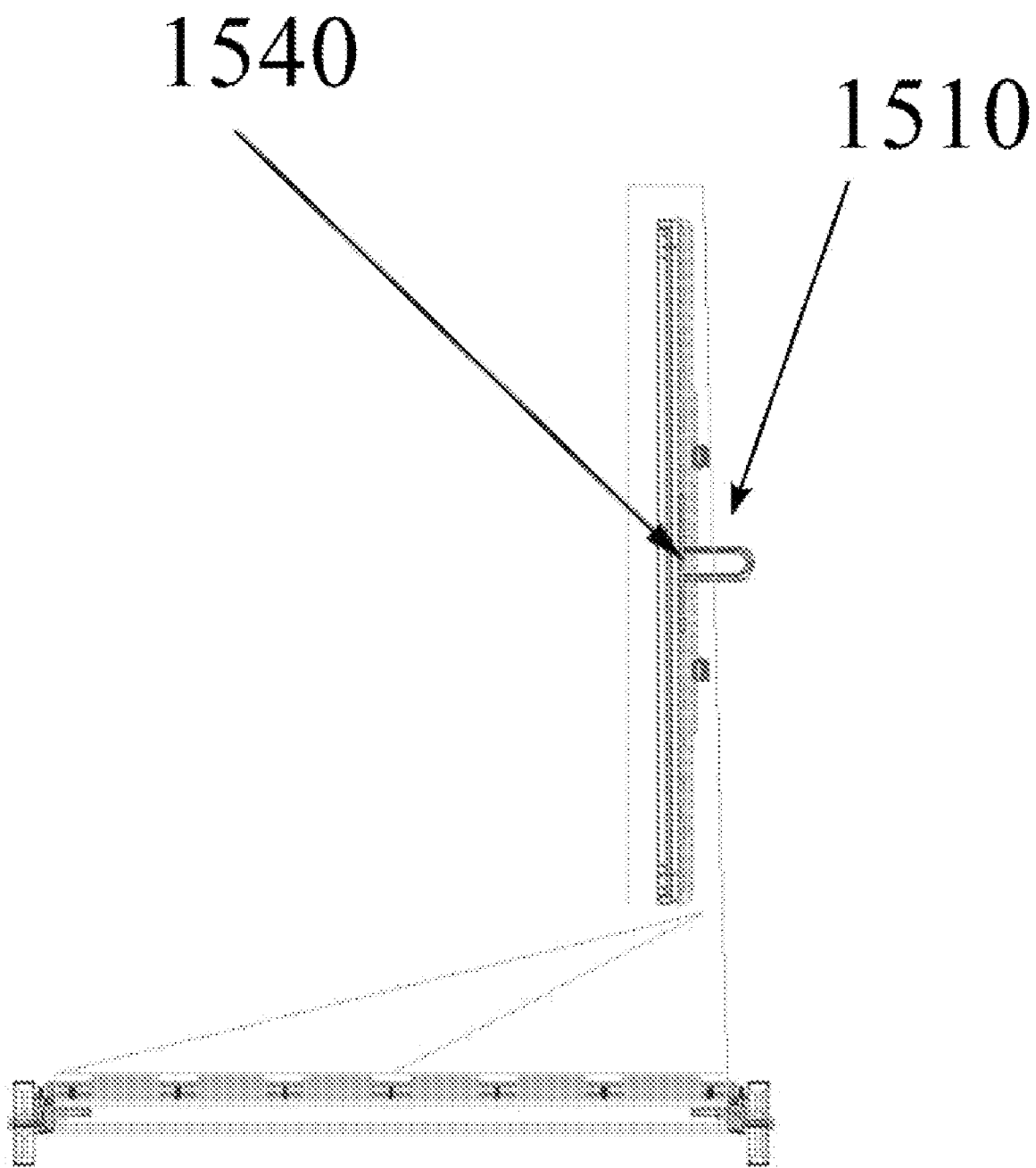
Figure 15E:
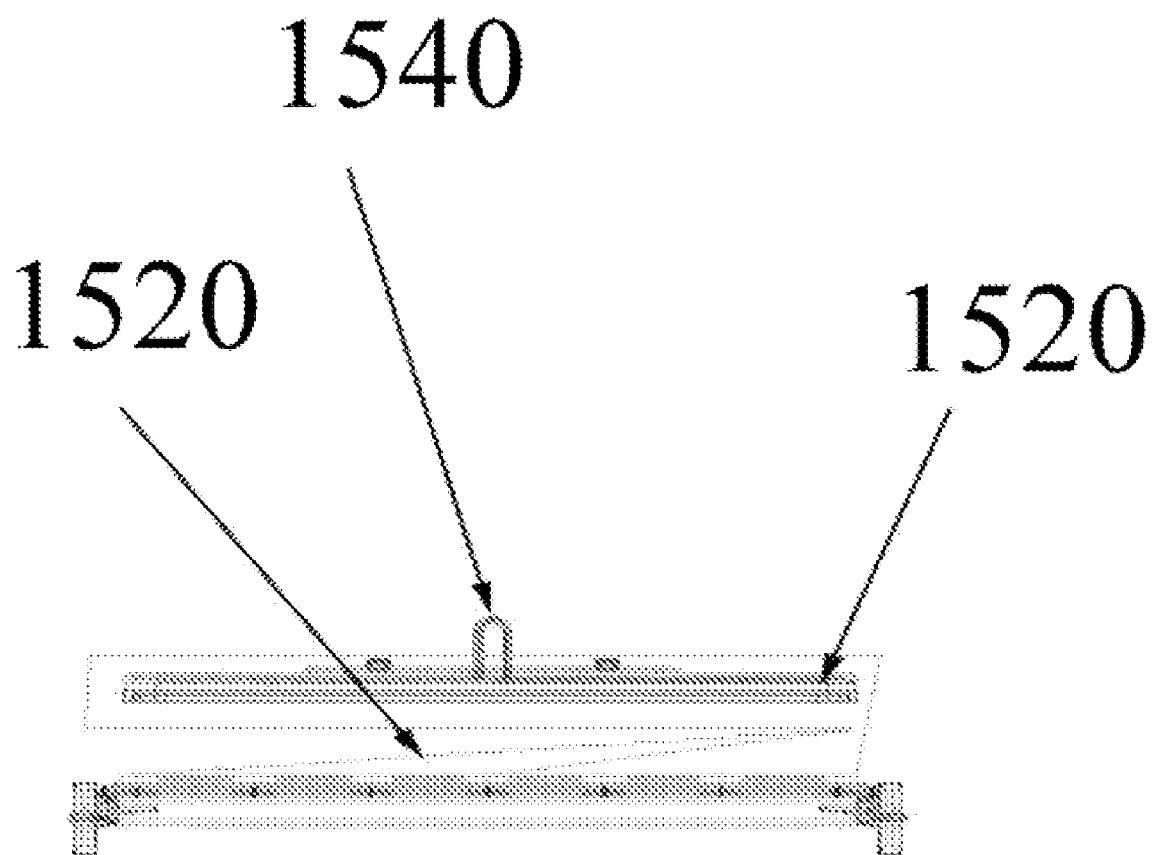

In an embodiment of the invention, the bag 1520 can be angle folded onto itself to pack the bag for storage when not in use. FIG. 15 shows the angle bag folding method. FIG. 15A shows the erect empty bag 1520 and hook 1540 attached to the transport base 1550 with wheels 1560. FIG. 15B shows the first fold of the erect empty bag and transport base 1500. FIG. 15C shows the next step in the folding of the erect empty bag and transport base 1500. FIG. 15D shows the second fold of the erect empty bag and transport base 1500, where the hook 1540 is passed through a hole in the bag. FIG. 15E shows the next step in the folding of the erect empty bag and transport base 1500, where the empty bag 1520 is pulled tight, the spreader plate can be attached to the transport base frame using clips or straps and the hook 1540 is available for lifting the packed bag and transport base 1500. In an alternative embodiment of the invention, the bag is folded concertina style. In another embodiment of the invention, drawstrings can be used to assist the folding of the bag.

In an alternative embodiment of the invention, the base frame allows dunnage platform dispensing and dunnage platform loading.

In one embodiment of the invention, the bag is made of one or more materials selected from the group consisting of Low Density Polyethylene (LDPE), High Density Polyethylene (HDPE) and polypropylene (PP). In another embodiment of the invention, the bag is made of flame retardant material. In an embodiment of the invention, the bag is made from polyethylene, aromatic bromine and antimony trioxide. In one embodiment of the invention, the bag is made of one or more of the following materials: LDPE, HDPE and PP and treated with ARX 501 FR 05 LD. In an embodiment of the invention, the bag meets standards DIN 4102 B2, DIN 4102 B1 and CEE. In a further embodiment of the invention, the bromine additive is heat stable up to 350° C.

Figure 16:
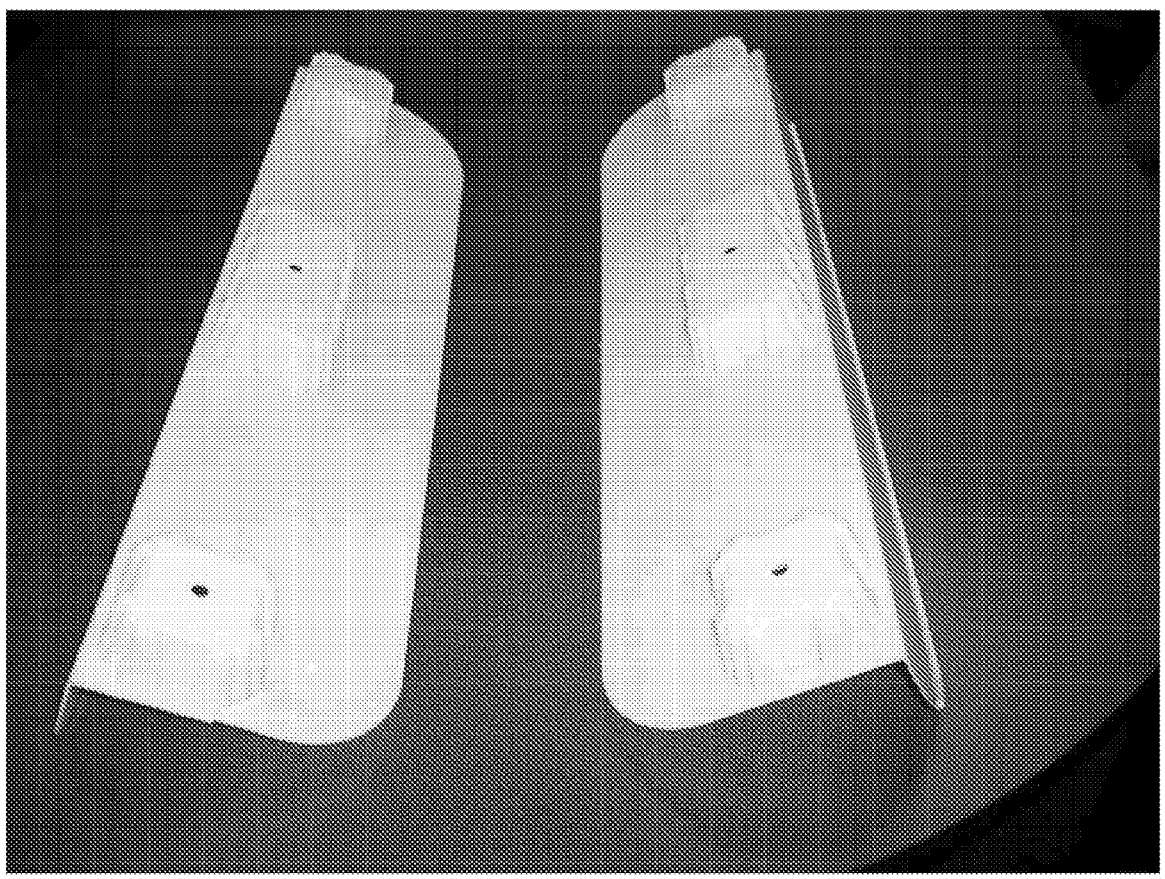
FIG. 16 shows a pair of inverted Optiledge™ high density polyethylene legs suitable for attachment onto a thermoplastic dunnage platform deck.
Figure 17:
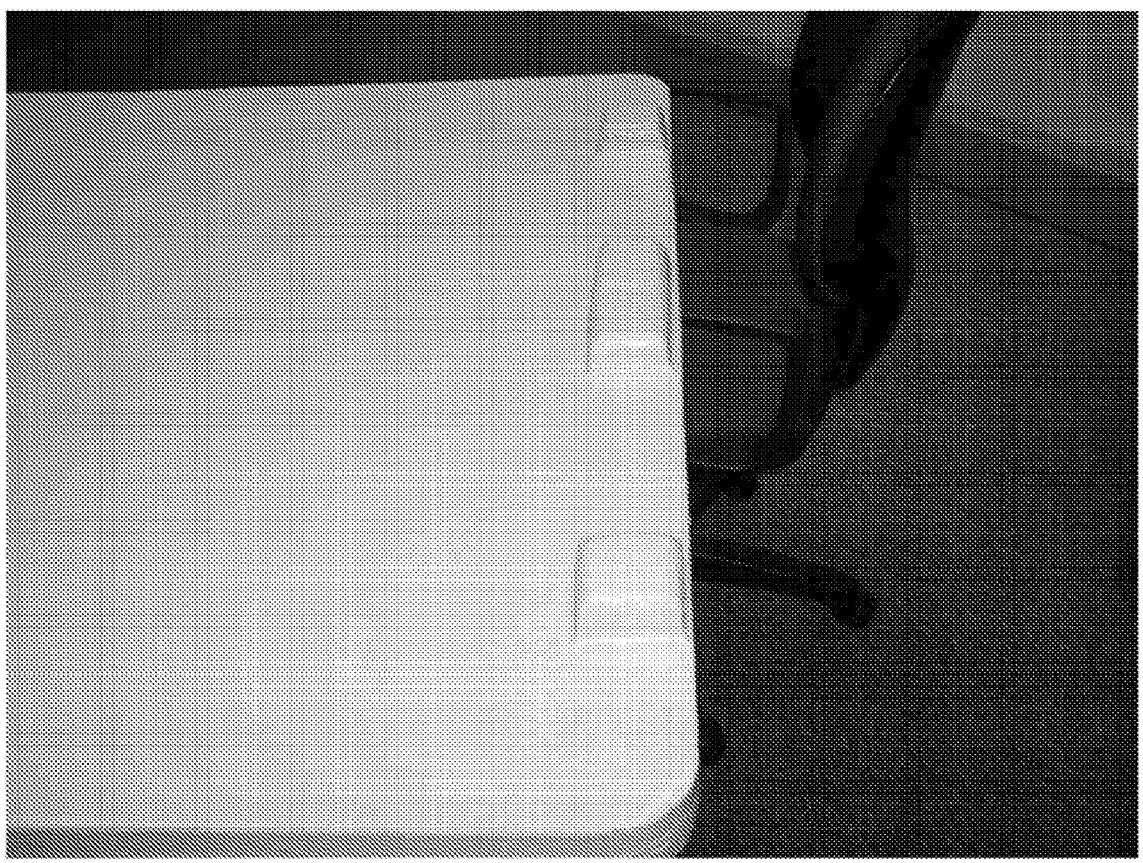
FIG. 17 shows the bottom side of a thermoplastic dunnage platform deck with stub-leg inserts attached.
Figure 18:
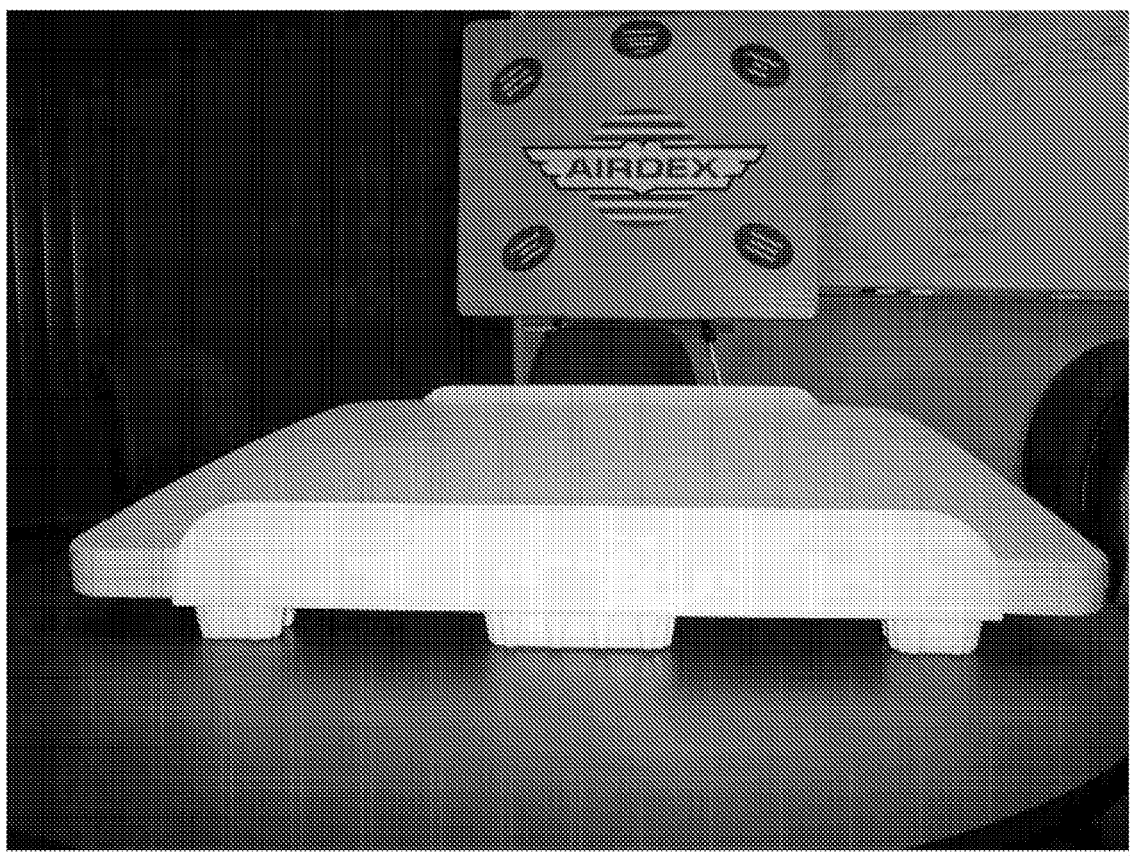
FIG. 18 shows a side view of the Optiledge™ high density polyethylene legs attached to a thermoplastic dunnage platform deck.
Figure 19:
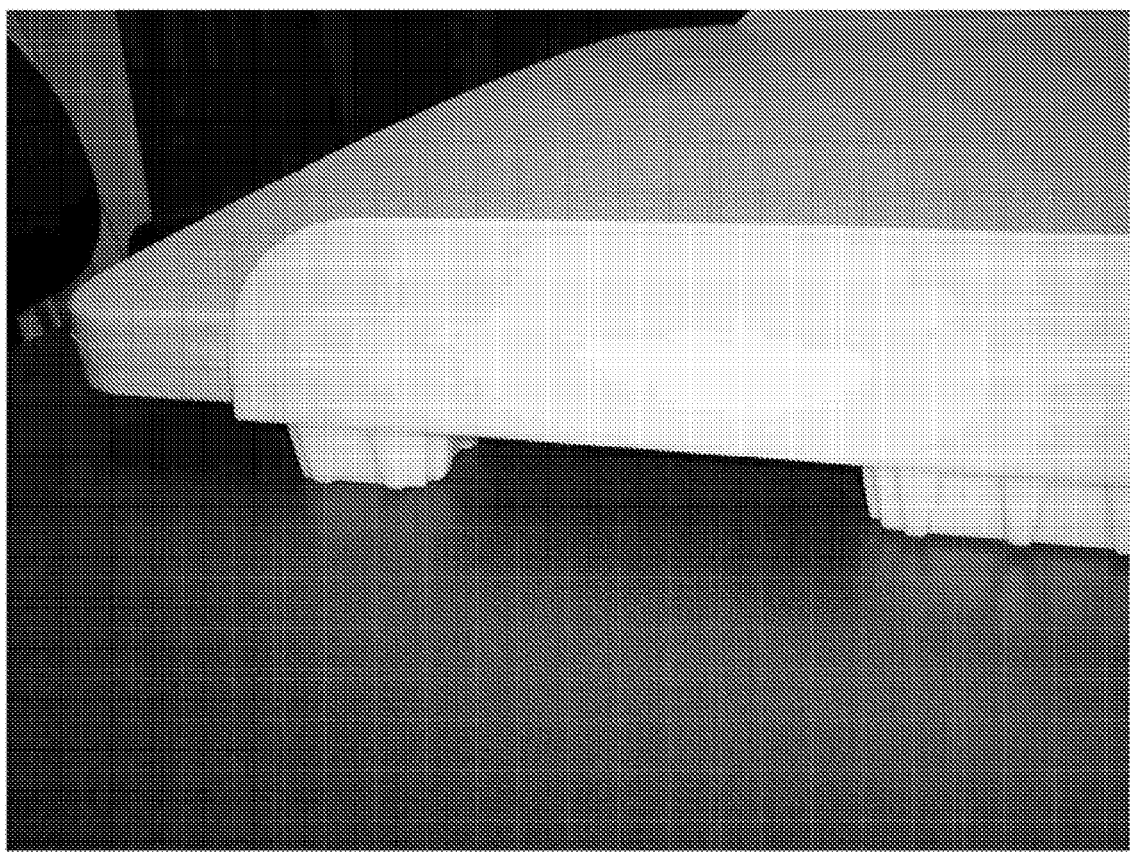
FIG. 19 shows the edge of the Optiledge™ high density polyethylene legs abutting the edge of the thermoplastic dunnage platform deck.
Figure 20:
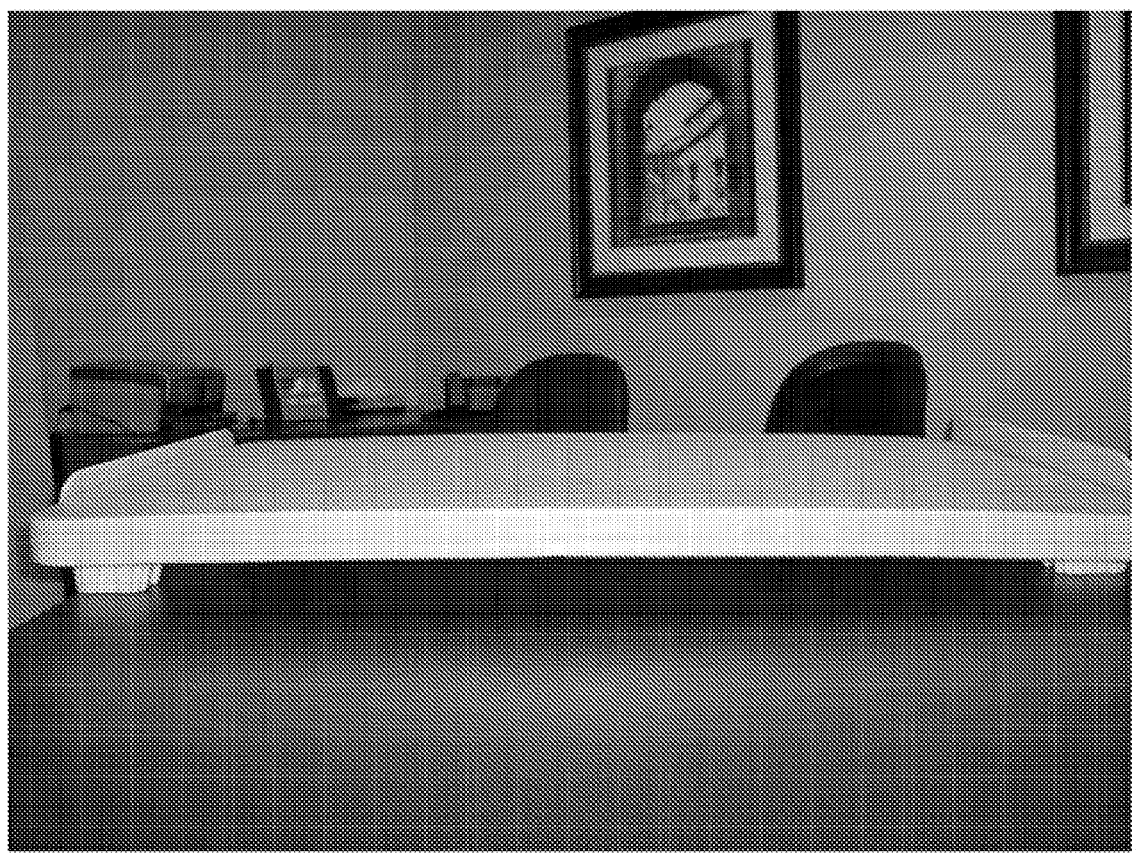
FIG. 20 shows a frontal view of the Optiledge™ high-density polyethylene legs attached to a thermoplastic dunnage platform deck.

In an embodiment of the present invention, the damaged feet of a dunnage platform can be removed and molded feet can be attached to the legless dunnage platform deck. Optiledge™ feet have been designed to be integral with the deck of cargo and then the deck, cargo and Optiledge™ feet can be strapped together. FIG. 16 shows a pair of Optiledge™ feet. When a dunnage platform is damaged, all the feet can be removed using a band saw or other suitable cutting device to remove the damaged feet thereby generating a thermoplastic dunnage platform deck. In an embodiment of the present invention, leg stubs can be attached to the thermoplastic dunnage platform deck. The leg stubs in the dunnage platform base can be generated by cutting up damaged thermoplastic dunnage platforms. In an alternative embodiment, the leg stubs can be affixed to the thermoplastic dunnage platform deck using molding. The leg stubs can also be attached using other means of adhering or affixing. Once affixed to the thermoplastic dunnage platform deck the leg stubs appear as shown in FIG. 17. The leg stubs can be used to locate a lightweight, strong, phytosanitary, molded feet in an L-shape designed to attach to the bottom of a deck. In an embodiment of the present invention the leg stubs can be used to attach to Optiledge™ feet. By applying suitable force the molded (Optiledge™) feet can be press fitted into the leg stubs. Once affixed the thermoplastic dunnage platform deck appears as shown in FIGS. 18-20. Shown in FIG. 19, the L shaped section of the Optiledge™ feet is abutting the edge of the thermoplastic dunnage platform deck. In FIGS. 16 and 19 the 'L' shaped molded feet can be made up of a first and a second member, which can be joined to form the 'L' shape. The hollow feet extend from one of the first or second members. The hollow feet can be press fitted into the leg stubs shown in FIG. 17.

Alternatively, a third leg can be added in between the two molded feet to provide additional support for the thermoplastic dunnage platform deck and cargo. By using molded feet without the L shaped retainer (or by removing the L-shaped section of the Optiledge™ feet), the molded feet can be applied to a flat surface. By affixing leg stubs in the center of the thermoplastic dunnage platform deck, and placing leg stubs in the center position an additional set of legs can be placed at any position under the deck.

In an alternative embodiment of the present invention, a thermoplastic dunnage platform with one or more damaged feet can be modified such that one or more of the damaged feet can be removed and one or more replacement feet can be attached in the location of the removed feet.

In an embodiment of the present invention, thermoplastic dunnage platforms in which the feet have been damaged can be collected at a point of destination shipping location. The feet of the thermoplastic dunnage platforms can be removed and the thermoplastic dunnage platforms decks can be stored in a flame retardant bag. Once the bag is filled the bag with the thermoplastic dunnage platforms decks can be shipped to a desired point of origin shipping location. Separately, or together molded feet can be shipped to the same location. Alternatively, the damaged thermoplastic dunnage platforms can be shipped to a desired point of origin shipping location and the legs can be removed at this location. Also at this location, one or more stub feet can be affixed to the thermoplastic dunnage platform deck and the molded feet can be affixed by press fitting into the stub legs. Alternative means of assembling molded feet onto the thermoplastic dunnage platform deck can be envisaged by one of ordinary skill in the art. Cargo can then be loaded on the assembled thermoplastic dunnage platforms with molded feet, strapped and shipped to the desired location.

In another embodiment of the invention, a Radio Frequency IDentification (RFID) tag is imbedded in one or more of: the spreader 310, the transporter base frame 350, the dispenser base 700, the reloading base 1100 and the material of the four walls 320. In one embodiment of the invention, the RFID tag operates using an Ultra High Frequency (UHF) signal. In another embodiment of the invention, the RFID tag operates using a microwave frequency signal.

In an embodiment of the present invention, a RFID tags can be inserted into the exposed polystyrene core after the damaged legs have been removed and prior to affixing the stub legs. In an embodiment of the present invention, a RFID reader mounted in the bag used to collect the thermoplastic dunnage platform decks can then read the RFID tags in the individual dunnage platforms. In an embodiment of the invention, the RFID reader in the bag and the RFID tag in the thermoplastic dunnage platform decks can be positioned so that the RFID tag antenna is least affected by any conducting material in the dunnage platform legs or dunnage platform bag.

In one embodiment, the RFID tag is centered in the middle of the spreader, the transporter base, the dispenser base, the reloading base and the material of the four walls. In another embodiment, the RFID tag is placed on the edge of the spreader, the transporter base, the dispenser base, the reloading base and the material of the four walls. In an embodiment of the invention, the RFID tag can be positioned so that the RFID tag antenna is least affected by the metal in the dunnage platform bag and base.

In one embodiment the RFID tag is read only. In another embodiment, the RFID tag contains an Electrically Erasable Programmable Read-Only Memory (EPROM), which enables both read and write functions. In an embodiment of the invention, the RFID tag is passive. In another embodiment of the invention, the RFID tag is semi passive containing a source of energy such as a battery to allow the tag to be constantly powered. In a further embodiment of the invention, the RFID tag is active, containing an internal power source, such as a battery, which is used to power any Integrated Circuits (ICs) in the tag and generate the outgoing signal. In another embodiment, the tag has the ability to enable location sensing through a photo sensor.

In an embodiment of the invention, the cargo and each dunnage platform contain a passive RFID tag and each dunnage platform bag contains an active RFID tag and RFID reader. Each dunnage platform bag is able to monitor the cargo and the dunnage platforms loaded in the dunnage platform bag. In a shipment, one or more master dunnage platform bag contains an RFID tag reader which is able to monitor all the other dunnage platform bags in the vicinity of the master dunnage platform bag. The master dunnage platform is then able to relay the position and condition of the entire shipment to a base station.

In one embodiment of the invention, means of communication with a base station is imbedded in the dunnage platform bag in one or more of the spreader, the transporter base, the dispenser base, the reloading base and the material of the four walls. In an alternative embodiment of the invention, one or more dunnage platforms loaded in the dunnage platform bag contain the apparatus to communicate with the base station in order to relay the condition and global position of the cargo.

In one embodiment of the invention, the communication means utilizes one or more of a wireless local area network; a wireless wide area network; a cellular network; a satellite network; a Wi-Fi network; and a pager network. In one embodiment of the invention, the device embedded is a modem capable of communicating with one or more of the aforementioned networks. In the following discussion the term 'cellular modem' will be used to describe the device embedded. The term 'cellular modem' will be herein used to identify any device of comparable size capable of communicating over one or more of the aforementioned networks. In one embodiment of the invention, the cellular modem can be a Code Division Multiple Access (CDMA) modem. In an embodiment of the invention, a RFID reader and associate integrated circuit processor can be embedded together with the cellular modem in the spreader, the transporter base, the dispenser base, the reloading base and the material of the four walls. In such an embodiment, the RFID tags and RFID reader can be positioned to optimize the RFID read of the RFID tags from the other surfaces, which make up the dunnage platform bag.

In an embodiment of the invention, where a RFID reader and a cellular modem can be embedded in one or more of the spreader, the transporter base, the dispenser base, the reloading base and the material of the four walls; the RFID reader is in communication with one or more RFID readers, associated cellular modems and the RFID tags of one or more dunnage platform bags in the vicinity of the RFID reader. Through communications with the RFID reader and associated integrated circuit processor of the plurality of dunnage platform bags in the vicinity, a RFID reader and associated integrated circuit processor is able to distinguish the RFID tag from dunnage platforms loaded in the bag and dunnage platforms loaded in dunnage platform bags in the vicinity based on one or more of location, strength of signal, variation of RFID tag signal with position in the dunnage platform bag relative to the reader, variation of RFID tag signal with time and prior input data. In an embodiment of the invention, one or more antenna inserted into the material of the bag can be used to help discriminate the location of the dunnage platforms loaded in a dunnage platform bag. In an embodiment of the invention, the RFID reader and associate processor can be in communication with the embedded cellular modem. In an embodiment of the invention, the cellular modem is in communication with a base station and can transmit one or more parameters selected from the group consisting of one or more RFID tag location, one or more RFID tag identification code, number of dunnage platforms loaded in the bag, dunnage platform bag information, previous shipment information, dunnage platform condition, dunnage platform bag condition and time stamp.

In one embodiment of the invention the RFID code uses the IEEE format and is Electronic Product Code (EPC) readable. In another embodiment of the invention the RFID code uses the UCC format and is Universal Product Code (UPC) readable. In another embodiment, the format is compatible for EPC, European Article Number (EAN) and UPC read and write functions.

Various embodiments can be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention can also be implemented by the preparation of integrated circuits and/or by interconnecting an appropriate network of component circuits, as will be readily apparent to those skilled in the art.

Various embodiments include a computer program product which is a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission can include a plurality of separate transmissions.

Stored on one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software can include, but is not limited to, device drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers and remote software to do the function. The invocations or calls can include invocations or calls in distributed and client/server systems.

What is claimed is:

1. A dunnage platform bag system for one or more of loading, dispensing, storing and transporting one or more dunnage platforms comprising:
    (a) a dunnage platform bag consisting of a top and one or more sides;
    (b) one or more openings in the dunnage platform bag for one or more of individually loading, dispensing and inspecting the one or more dunnage platforms stored in the dunnage platform bag, wherein one of the one or more openings is a base opening, wherein the base opening is distal from the top;
    (c) an indexing mechanism that holds one or more dunnage platforms, wherein the indexing mechanism holds the dunnage platform most distant from the top in a position to cover the base opening;
    (d) a bracket attached to the dunnage platform bag, wherein the bracket can be used for lifting the dunnage platform bag; and
    (e) a hoist mechanism that is configured to position the dunnage platform bag and a connected transport base, wherein the transport base includes a transport base frame and a plurality of wheels attached to the transport base frame, wherein the plurality of wheels allow the transport base and the connected dunnage platform bag to be rolled, wherein the hoist mechanism allows the dunnage platform bag to be positioned so that one or more wheels of the transport base are aligned with one or both of a dispensing base and a dispensing and reloading base.

2. The system of claim 1, wherein the dunnage platform bag is woven from flame retardant material selected from the group consisting of Low Density Polyethylene (LDPE), High Density Polyethylene (HDPE) and polypropylene (PP) and treated with a flame retardant coating.

3. The system of claim 1, wherein the dunnage platform bag is made of flame retardant non-woven material.

4. The system of claim 1, wherein the dimensions of the dunnage platform bag are adjustable to fit the size and number of dunnage platforms to be loaded into the dunnage platform bag.

5. The system of claim 1, further comprising a transport base connected to the base opening of the dunnage platform bag, wherein the transport base includes a transport base frame with a longitudinal axis, and a plurality of wheels attached to the transport base frame, wherein the plurality of wheels allow the transport base and the connected dunnage platform bag to be rolled in the direction of the base frame longitudinal axis, wherein the transport base assists in the movement of the dunnage platform bag.

6. The system of claim 1, further comprising a base selected from the group consisting of a dispensing base, a reloading base and a combined dispensing and reloading base, for one or more of dispensing and reloading one or more dunnage platform from and into the dunnage platform bag.

7. The system of claim 6, wherein the base attaches to the base opening in the dunnage platform bag.

8. The system of claim 1, wherein the dunnage platforms comprise:
    a thermoplastic dunnage platform deck; and
    two or more feet affixed onto the thermoplastic dunnage platform deck.

9. The system of claim 1, further comprising one or more Radio Frequency IDentification (RFID) tag inserted in one or more of the dunnage platforms and the dunnage platform bag.

10. The system of claim 9, further comprising a processor and a RFID tag reader, wherein the processor is in communication with the RFID reader, wherein the RFID reader is able to read one or more RFID tags of one or both the dunnage platform bag and one or more dunnage platforms loaded in the dunnage platform bag.

11. The system of claim 10, wherein the processor receives one or both of operator input information and RFID tag reader scanned information about the condition of one or more dunnage platform loaded into the dunnage platform bag.

12. The system of claim 10, wherein the processor receives one or both of operator input information and RFID tag reader scanned information about one or both the condition of one or more dunnage platform bag and the condition of one or more dunnage platform in a dunnage platform bag in the vicinity.

13. The system of claim 10, wherein the processor is able to distinguish between a RFID signal from one or more RFID tags of one or more dunnage platforms loaded in a dunnage platform bag and a RFID signal from a RFID tag not loaded in a dunnage platform bag, wherein the processor is able to distinguish the RFID signal based on one or more parameters selected from the group consisting of RFID tag location, RFID tag identification code, shipment information, time stamp and changes in RFID tag location with time stamp.

14. The system of claim 10, further comprising a portal in contact with the processor, wherein the portal is in communication with a base station, wherein the portal transmits to the base station one or more parameters selected from the group consisting of one or more RFID tag location, one or more RFID tag identification code, dunnage platform bag information, dunnage platform bag condition, dunnage platform condition, time stamp and changes in RFID tag location with time stamp.

15. The system of claim 10, further comprising a base selected from the group consisting of a dispensing base, a reloading base and a combined dispensing and reloading base, wherein the processor keeps a record of the number and condition of dunnage platforms loaded and dispensed from the dunnage platform bag.

16. The system of claim 1, further comprising a combined dispensing and reloading base, for dispensing and reloading one or more dunnage platforms from and into the dunnage platform bag.

17. A dunnage platform bag system for one or more of loading, dispensing, storing and transporting one or more dunnage platforms comprising:
 (a) a dunnage platform bag consisting of a top and one or more sides;
 (b) a base opening in the dunnage platform bag for individually one or more of loading, dispensing and inspecting the one or more dunnage platforms stored in the dunnage platform bag;
 (c) an indexing mechanism that holds one or more dunnage platforms in the dunnage bag wherein the indexing mechanism holds the dunnage platform most distant from the top in a position to cover the base opening;
 (d) a bracket attached to the dunnage platform bag, wherein the bracket can be used for lifting the dunnage platform bag; and
 (e) a hoist mechanism that is configured to position the dunnage platform bag and a connected transport base, wherein the transport base includes a transport base frame and a plurality of wheels attached to the transport base frame, wherein the plurality of wheels allow the transport base and the connected dunnage platform bag to be rolled, wherein the hoist mechanism allows the dunnage platform bag to be positioned so that one or more wheels of the transport base are aligned with one or both of a dispensing base and a dispensing and reloading base.

18. The system of claim 17, wherein the dunnage platform bag is made of flame retardant material.

19. A dunnage platform bag system for one or more of loading, dispensing, storing and transporting one or more dunnage platforms comprising:
 (a) a dunnage platform bag consisting of a top and one or more sides, wherein the dunnage platform bag is made of flame retardant material;
 (b) a base opening in the dunnage platform bag for individually one or more of loading and dispensing the one or more dunnage platforms stored in the dunnage platform bag;
 (c) an indexing mechanism that holds one or more dunnage platforms in the dunnage bag wherein the indexing mechanism holds the dunnage platform most distant from the top in a position to cover the base opening;
 (d) a bracket attached to the dunnage platform bag, wherein the bracket can be used for lifting the dunnage platform bag; and
 (e) a hoist mechanism that is configured to position the dunnage platform bag and a connected transport base, wherein the transport base includes a transport base frame and a plurality of wheels attached to the transport base frame, wherein the plurality of wheels allow the transport base and the connected dunnage platform bag to be rolled, wherein the hoist mechanism allows the dunnage platform bag to be positioned so that one or more wheels of the transport base are aligned with one or both of a dispensing base and a dispensing and reloading base.

20. A dunnage platform bag system for one or more of loading, dispensing, storing and transporting one or more dunnage platforms comprising:
 (a) a dunnage platform bag consisting of a top and one or more sides;
 (b) one or more openings in the dunnage platform bag for one or more of individually loading, dispensing and inspecting the one or more dunnage platforms stored in the dunnage platform bag, wherein one of the one or more openings is a base opening, wherein the base opening is distal from the top;
 (c) an indexing mechanism that holds one or more dunnage platforms, wherein the indexing mechanism holds the dunnage platform most distant from the top in a position to cover the base opening;
 (d) one or more Radio Frequency Identification (RFID) tag inserted in one or more of the dunnage platforms and the dunnage platform bag;
 (e) a processor and a RFID tag reader, wherein the processor is in communication with the RFID reader, wherein the RFID reader is able to read one or more RFID tags of one or both the dunnage platform bags and one or more dunnage platforms loaded in the dunnage platform bag; and
 (f) wherein the processor receives one or both of operator input information and RFID tag reader scanned information about the condition of one or more dunnage platforms loaded into the dunnage platform bag.

21. A dunnage platform bag system for one or more of loading, dispensing, storing and transporting one or more dunnage platforms comprising:
 (a) a dunnage platform bag consisting of a top and one or more sides;
 (b) one or more openings in the dunnage platform bag for one or more of individually loading, dispensing and inspecting the one or more dunnage platforms stored in the dunnage platform bag, wherein one of the one or more openings is a base opening, wherein the base opening is distal from the top;
 (c) an indexing mechanism that holds one or more dunnage platforms, wherein the indexing mechanism holds the dunnage platform most distant from the top in a position to cover the base opening;

(d) one or more Radio Frequency Identification (RFID) tag inserted in one or more of the dunnage platforms and the dunnage platform bag;

(e) a processor and a RFID tag reader, wherein the processor is in communication with the RFID reader, wherein the RFID reader is able to read one or more RFID tags of one or both the dunnage platform bags and one or more dunnage platforms loaded in the dunnage platform bag; and (f) wherein the processor receives one or both of operator input information and RFID tag reader scanned information about one or both the condition of one or more dunnage platform bags and the condition of one or more dunnage platforms in a dunnage platform bag in the vicinity.

22. A dunnage platform bag system for one or more of loading, dispensing, storing and transporting one or more dunnage platforms comprising:

(a) a dunnage platform bag consisting of a top and one or more sides;

(b) one or more openings in the dunnage platform bag for one or more of individually loading, dispensing and inspecting the one or more dunnage platforms stored in the dunnage platform bag, wherein one of the one or more openings is a base opening, wherein the base opening is distal from the top;

(c) an indexing mechanism that holds one or more dunnage platforms, wherein the indexing mechanism holds the dunnage platform most distant from the top in a position to cover the base opening;

(d) one or more Radio Frequency Identification (RFID) tag inserted in one or more of the dunnage platforms and the dunnage platform bag;

(e) a processor and a RFID tag reader, wherein the processor is in communication with the RFID reader, wherein the RFID reader is able to read one or more RFID tags of one or both the dunnage platform bags and one or more dunnage platforms loaded in the dunnage platform bag; and (f) wherein the processor is able to distinguish between a RFID signal from one or more RFID tags of one or more dunnage platforms loaded in a dunnage platform bag and a RFID signal from a RFID tag not loaded in a dunnage platform bag, wherein the processor is able to distinguish the RFID signal based on one or more parameters selected from the group consisting of RFID tag location, RFID tag identification code, shipment information, time stamp and changes in RFID tag location with time stamp.

23. A dunnage platform bag system for one or more of loading, dispensing, storing and transporting one or more dunnage platforms comprising;

(a) a dunnage platform bag consisting of a top and one or more sides;

(b) one or more openings in the dunnage platform bag for one or more of individually loading, dispensing and inspecting the one or more dunnage platforms stored in the dunnage platform bag, wherein one of the one or more openings is a base opening, wherein the base opening is distal from the ton;

(c) an indexing mechanism that holds one or more dunnage platforms, wherein the indexing mechanism holds the dunnage platform most distant from the top in a position to cover the base opening;

(d) one or more Radio Frequency Identification (RFID) tag inserted in one or more of the dunnage platforms and the dunnage platform bag;

(e) a processor and a RFID tag reader, wherein the processor is in communication with the RFID reader, wherein the RFID reader is able to read one or more RFID tags of one or both the dunnage platform bags and one or more dunnage platforms loaded in the dunnage platform bag; and (f) a portal in contact with the processor, wherein the portal is in communication with a base station, wherein the portal transmits to the base station one or more parameters selected from the group consisting of one or more RFID tag locations, one or more RFID tag identification codes, dunnage platform bag information, dunnage platform bag condition, dunnage platform condition, time stamp and changes in RFID tag location with time stamp.

* * * * *

UNITED STATES PATENT AND TRADEMARK OFFICE
CERTIFICATE OF CORRECTION

| | | |
|---|---|---|
| PATENT NO. | : 7,689,481 B2 | Page 1 of 1 |
| APPLICATION NO. | : 11/675049 | |
| DATED | : March 30, 2010 | |
| INVENTOR(S) | : Seagle et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 34 days.

Signed and Sealed this

Fourth Day of January, 2011

David J. Kappos
*Director of the United States Patent and Trademark Office*